United States Patent
Ishizu

(10) Patent No.: US 12,113,900 B2
(45) Date of Patent: Oct. 8, 2024

(54) COMMUNICATION APPARATUS AND CONTROL METHOD

(71) Applicant: CANON KABUSHIKI KAISHA, Tokyo (JP)

(72) Inventor: Akihiko Ishizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 17/950,255

(22) Filed: Sep. 22, 2022

(65) Prior Publication Data

US 2023/0115108 A1     Apr. 13, 2023

(30) Foreign Application Priority Data

Oct. 12, 2021 (JP) .................................. 2021-167576

(51) Int. Cl.
*H04L 9/32* (2006.01)
*H04L 9/40* (2022.01)

(52) U.S. Cl.
CPC .............. *H04L 9/32* (2013.01); *H04L 63/045* (2013.01); *H04L 63/0869* (2013.01); *H04L 2209/08* (2013.01)

(58) Field of Classification Search
None
See application file for complete search history.

(56) References Cited

U.S. PATENT DOCUMENTS

| 10,333,783 | B2 | 6/2019 | Ishizu |
| 10,791,209 | B2 | 9/2020 | Koizumi et al. |
| 2017/0085425 | A1* | 3/2017 | Ishizu ..................... H04L 12/28 |
| 2019/0245869 | A1* | 8/2019 | Dawes ..................... G06F 3/041 |

FOREIGN PATENT DOCUMENTS

JP      2020-039104 A    3/2020

* cited by examiner

*Primary Examiner* — Cai Y Chen
(74) *Attorney, Agent, or Firm* — VENABLE LLP

(57) ABSTRACT

A communication apparatus communicates with an electronic apparatus, accepts input of connection information including first information, which is identification information of a first network to be used for wireless communication with an external apparatus, and second information, which is security information for connecting to the first network, and transmits the connection information to the electronic apparatus. The communication apparatus, when acceptance of the connection information starts, displays a first display region for accepting input of the first information and displays the first information acquired from the electronic apparatus in the first display region, and when acceptance of the connection information starts, displays a second display region for accepting input of the second information and displays dummy information in the second display region without acquiring the second information.

17 Claims, 15 Drawing Sheets

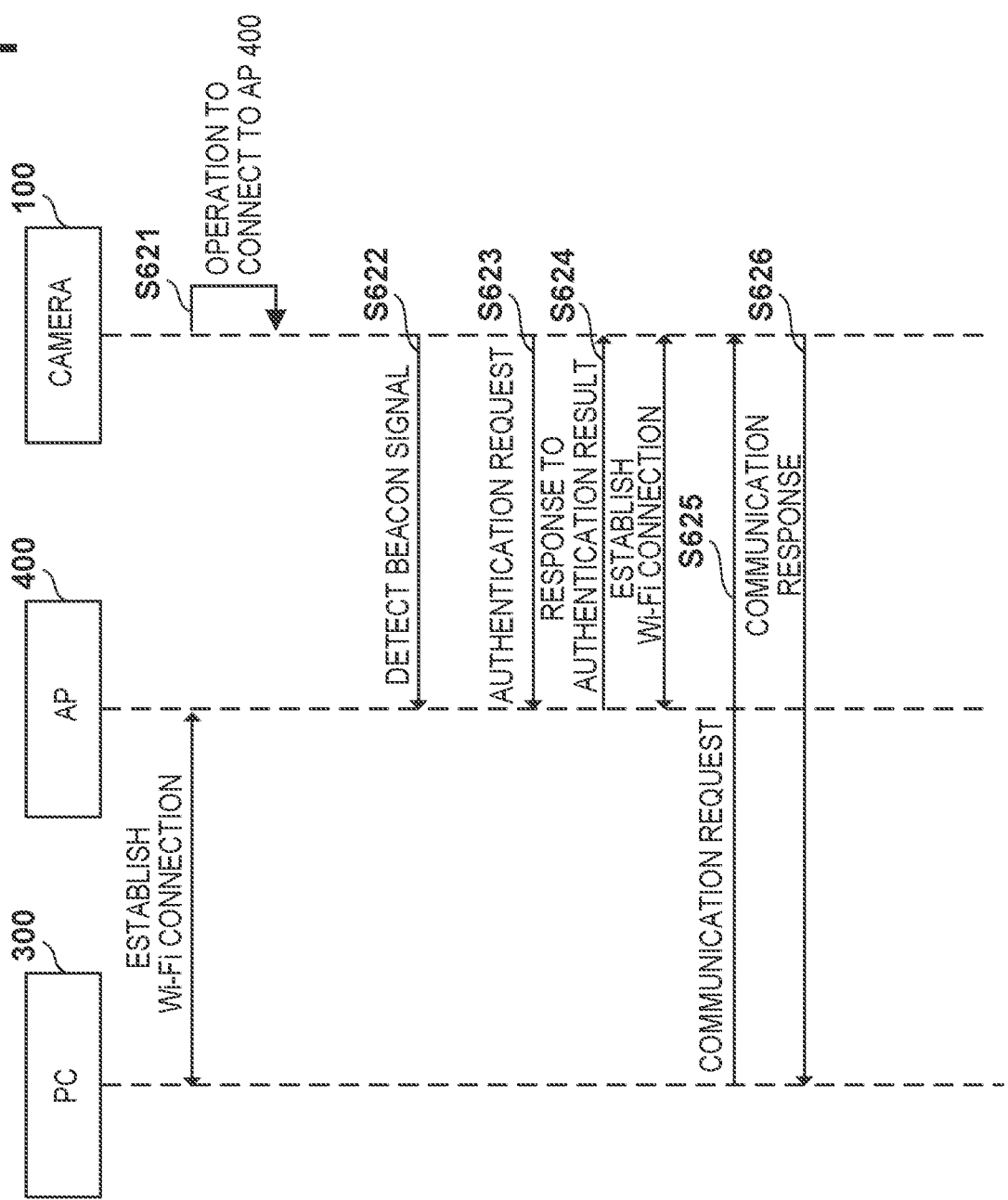

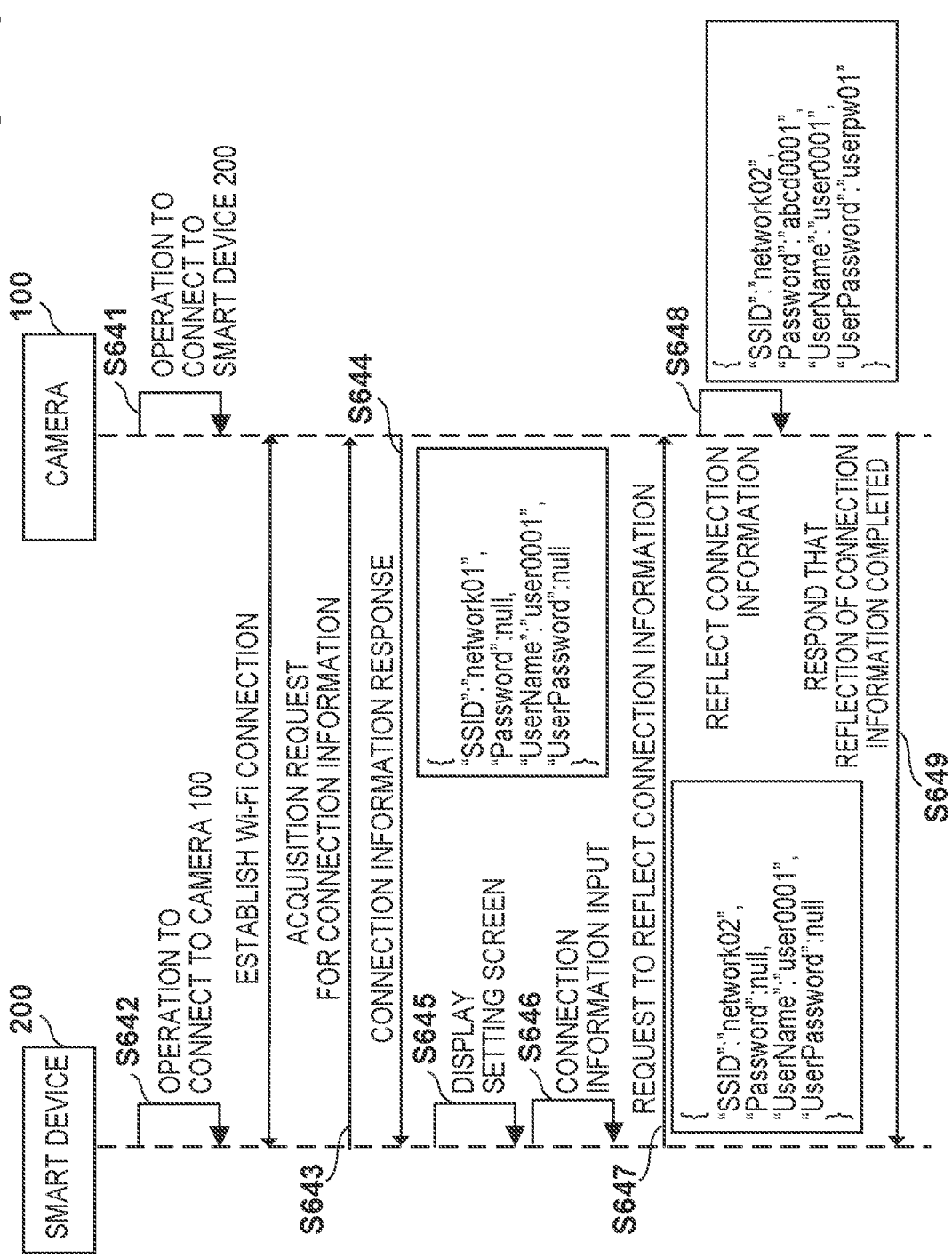

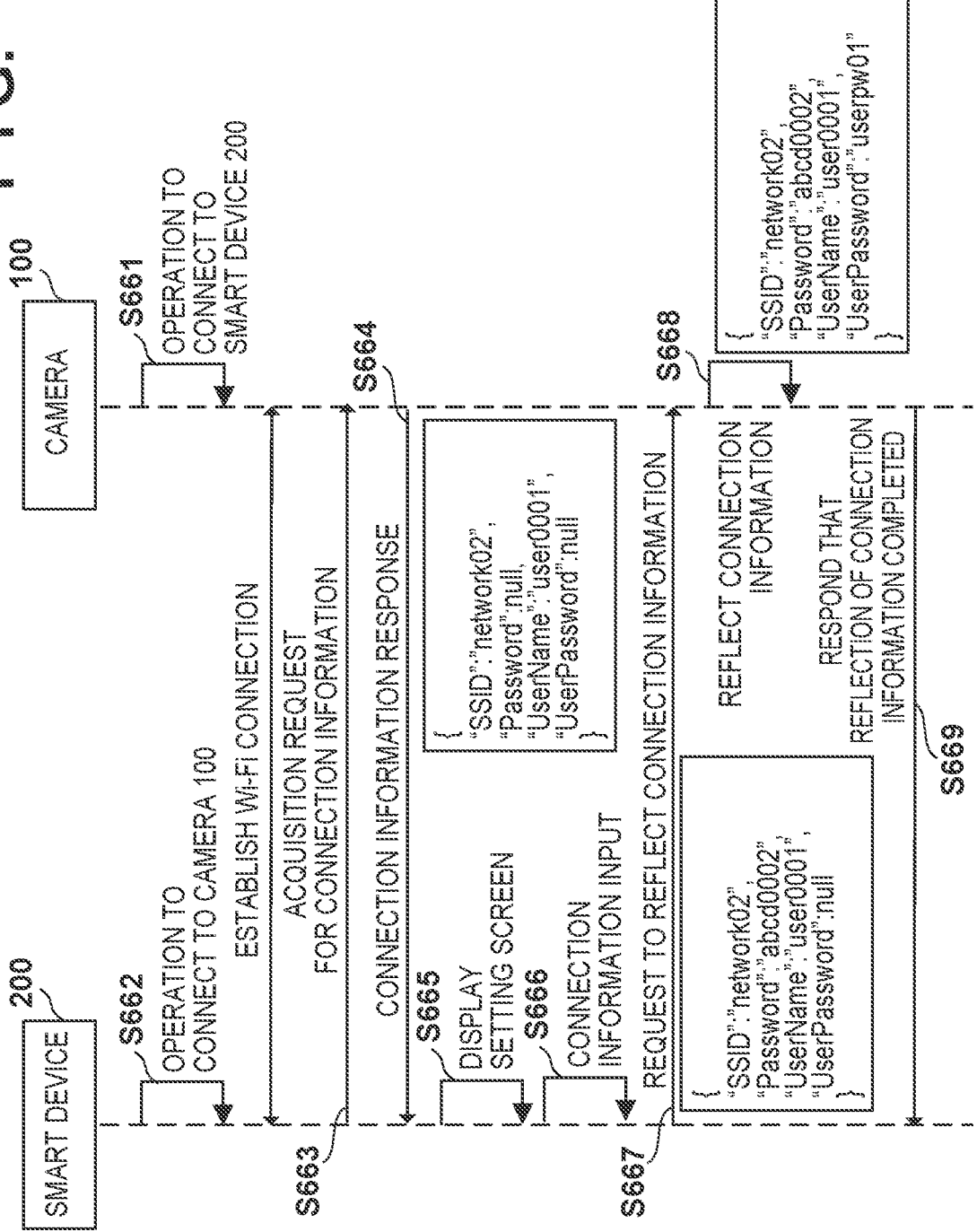

COMMUNICATION APPARATUS AND CONTROL METHOD

BACKGROUND OF THE INVENTION

Field of the Invention

The present invention relates to a system in which an electronic apparatus wirelessly communicates with a communication apparatus and an external apparatus.

Description of the Related Art

There are electronic apparatuses such as digital cameras that wirelessly communicate with a communication apparatus such as a smart phone and an external apparatus such as a personal computer (PC) and that are not provided with a display unit and that are only provided with the minimum required operation unit to reduce size and/or weight. With such electronic apparatuses, for example, input and confirmation of connection information, such as a service set identifier (SSID), a password, or the like, for connecting to a network such as a wireless local area network (LAN) cannot be performed.

The method described in Japanese Patent Laid-Open No. 2020-039104 includes transmitting connection information from a communication apparatus such as a smart device to an electronic apparatus such as a printer to perform a wireless connection setting of the electronic apparatus using the communication apparatus.

However, in a network in which the user can change the connection information, when the connection information is changed, the connection information of the network needs to be re-set for the electronic apparatus. In this case, according to Japanese Patent Laid-Open No. 2020-039104, the changed connection information needs to be re-entered into the communication apparatus and then transmitted to the electronic apparatus. Plausibly, a method may be used that includes the communication apparatus acquiring the connection information already set for the electronic apparatus from the electronic apparatus via wireless communication, but because the password is acquired via wireless communication, there is a possibility of it being leaked or stolen.

SUMMARY OF THE INVENTION

The present invention has been made in consideration of the aforementioned problems, and realizes techniques capable of reducing the trouble when the user enters connection information of a network into a communication apparatus while maintaining the confidentiality of the connection information of the network.

In order to solve the aforementioned problems, the present invention provides a communication apparatus comprising: a communication unit configured to communicate with an electronic apparatus; an accepting unit configured to accept input of connection information including first information, which is identification information of a first network to be used for wireless communication with an external apparatus, and second information, which is security information for connecting to the first network; and a control unit configured to transmit the connection information to the electronic apparatus via the communication unit, wherein, when acceptance of the connection information by the accepting unit starts, the control unit displays a first display region for accepting input of the first information and displays the first information acquired from the electronic apparatus in the first display region, and when acceptance of the connection information by the accepting unit starts, the control unit also displays a second display region for accepting input of the second information and displays dummy information in the second display region without acquiring the second information.

In order to solve the aforementioned problems, the present invention provides a method of controlling a communication apparatus comprising: wherein the communication apparatus includes a communication unit configured to communicate with an electronic apparatus, an accepting unit configured to accept input of connection information including first information, which is identification information of a first network to be used for wireless communication with an external apparatus, and second information, which is security information for connecting to the first network, and a control unit configured to transmit the connection information to the electronic apparatus via the communication unit, wherein the method includes: when acceptance of the connection information by the accepting unit starts, displaying a first display region for accepting input of the first information and displaying the first information acquired from the electronic apparatus in the first display region; and when acceptance of the connection information by the accepting unit starts, displaying a second display region for accepting input of the second information and displaying dummy information in the second display region without acquiring the second information.

In order to solve the aforementioned problems, the present invention provides a non-transitory computer-readable storage medium storing a program for causing a processor to function as a communication apparatus comprising: a communication unit configured to communicate with an electronic apparatus; an accepting unit configured to accept input of connection information including first information, which is identification information of a first network to be used for wireless communication with an external apparatus, and second information, which is security information for connecting to the first network; and a control unit configured to transmit the connection information to the electronic apparatus via the communication unit, wherein, when acceptance of the connection information by the accepting unit starts, the control unit displays a first display region for accepting input of the first information and displays the first information acquired from the electronic apparatus in the first display region, and when acceptance of the connection information by the accepting unit starts, the control unit also displays a second display region for accepting input of the second information and displays dummy information in the second display region without acquiring the second information.

According to the present invention, the trouble when the user enters connection information of a network into a communication apparatus can be reduced while maintaining the confidentiality of the connection information of the network.

Further features of the present invention will become apparent from the following description of exemplary embodiments (with reference to the attached drawings).

BRIEF DESCRIPTION OF THE DRAWINGS

FIGS. 6A to 6D are sequences illustrating communication processing of the electronic apparatus, the communication apparatus, and the external apparatus according to the present embodiment.

DESCRIPTION OF THE EMBODIMENTS

Figure 1:
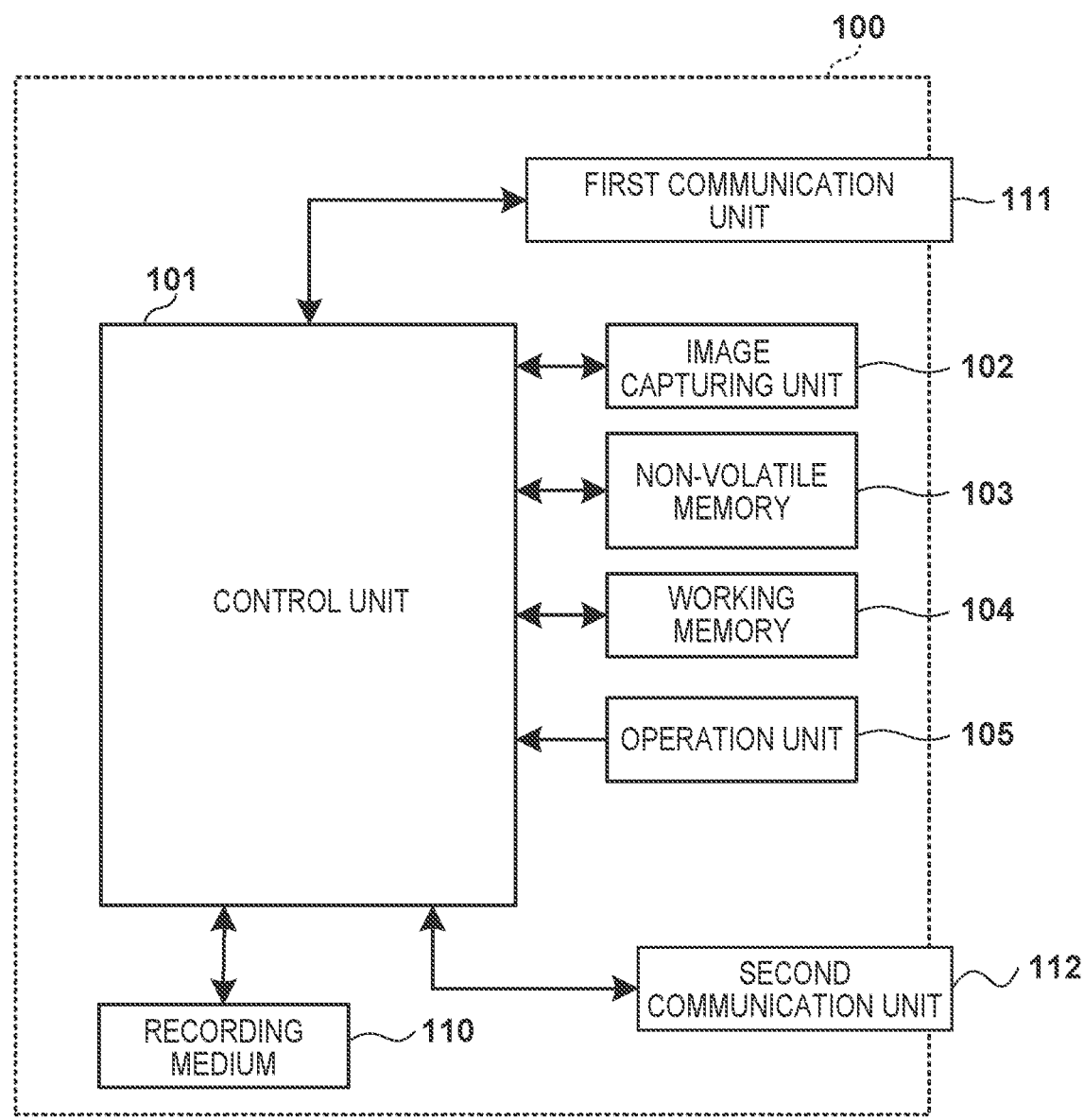
FIG. 1 is a block diagram illustrating the configuration of an electronic apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an embodiment will be described in detail with reference to the attached drawings. In this embodiment, the electronic apparatus of the present invention is applied to an image capturing apparatus such as a digital camera, the communication apparatus of the present invention is applied to a portable terminal such as a smart device, and the external apparatus of the present invention is applied to an information processing apparatus such as a personal computer (PC).

Apparatus Configuration

First, the configuration and function of the electronic apparatus, the communication apparatus, and the external apparatus will be described with reference to FIGS. 1 to 3.

FIG. 1 is a block diagram illustrating the configuration of a digital camera 100 according to the present embodiment. Note that hereinafter, a digital camera will be used as an example of the electronic apparatus. However, no such limitation is intended, and other examples include a web camera or network camera capable of transferring images to a PC via a network, an in-vehicle camera, a surveillance camera, a medical camera, a smart speaker, and the like.

A control unit 101 is an arithmetic processing apparatus (CPU) that controls the entire digital camera (referred to as camera below) 100 and implements communication processing and control processing described below by executing a program stored in a non-volatile memory 103 described below. Note that instead of the control unit 101 controlling the entire apparatus, a plurality of hardware may share the processing to control the entire apparatus.

An image capturing unit 102 includes a lens group including a zoom lens and the focus lens and a shutter with a diaphragm function. Also, the image capturing unit 102 includes an image sensor constituted by a CCD or CMOS element or the like that converts an object image into an electrical signal and an A/D converter that converts an analog image signal output from the image sensor into a digital signal. The image capturing unit 102, via control by the control unit 101, converts, via the image sensor, object image light formed by the lens included in the image capturing unit 102 into an electrical signal, performs noise reduction processing and the like, and outputs image data based on the digital signal.

The control unit 101 executes pixel interpolation, resize processing to reduce size, and color conversion processing on image data captured by the image capturing unit 102. Also, the control unit 101 compresses and encodes a still image on which an image processing has been given using JPEG or the like or encodes a moving image via a moving image compression method, such as MPEG2 or H.264, and generates an image file, which is then recorded in a recording medium 110. In the camera 100 of the present embodiment, the image data is recorded in the recording medium 110 in accordance with Design rule for Camera File system (DCF) standards. Also, the control unit 101 performs predetermined arithmetic processing using the captured image data and executes autofocus (AF) processing and automatic exposure (AE) processing by the control unit 101 controlling the focus lens, the diaphragm, and the shutter of the image capturing unit 102 on the basis of the obtained calculation result.

The non-volatile memory 103 is a memory which is electrically erasable and recordable, such as EEPROM, for example. Constants, programs, and the like for operation of the control unit 101 are recorded in the non-volatile memory 103. Herein, programs refer to programs for executing the various communication processing and control processing described below in the present embodiment.

Constants and variables for operation of the control unit 101 and programs read out from the non-volatile memory 103 are loaded on a working memory 104 used as a work area. Also, the working memory 104 is used as buffer memory that temporarily stores image data captured by the image capturing unit 102.

An operation unit 105 includes various switches, buttons, and other operation members for accepting various operations from a user. The operation unit 105 includes, for example, a power button for turning on and off the power supply, a shutter button for instructing to capture a still image, a shutter button for instructing to start or stop a moving image recording, a reproduction button for instruction to reproduce an image, and a switch mode button for changing the operation mode of the camera to a still image capturing mode, a moving image recording mode, and a reproduction mode. Also, the operation unit 105 includes a dedicated connection button for starting communications with an external device, such as a smart device 200 or a PC 300 and an access point (hereinafter referred to as AP) 400 described below.

The shutter button turns on halfway through the operation, or in other words when half pressed (capturing preparation instruction), and generates a first shutter switch signal SW1. In response to the first shutter switch signal SW1, operations, such as autofocus (AF) processing, automatic exposure (AE) processing, automatic white balance (AWB) processing, and pre-flash emission (EF) processing, are started via control of the image capturing unit 102 by the control unit 101. Also, the shutter button turns on when the operation of the shutter button is completed, or in other words when fully pressed (image capture instruction), and generates a second shutter switch signal SW2. In response to the second shutter switch signal SW2, the control unit 101 starts a series of image capture processing operations from reading out a signal from the image capturing unit 102 to writing the image data on the recording medium 110.

The camera 100 of the present embodiment is not provided with a display unit or a touch panel integrally formed with a display unit for displaying a live view image, displaying a captured image, or displaying a UI screen for interactive operations. Thus, with the camera 100 of the present embodiment, a user cannot input or confirm connection information, such as an S SID, password, user name, user password, or the like, for connecting to the PC 300 or the AP 400 via a wireless LAN network described below.

The recording medium 110 records image data output from the image capturing unit 102 and is where image files already recorded are read out by the control unit 101. The recording medium 110 may be a memory card or hard disk drive installed in the camera 100 or may be a flash memory or hard disk drive built-in the camera 100. The camera 100 is only required to include a way of accessing the recording medium 110.

A first communication unit 111 is an interface for connecting to an external device, such as the smart device 200 or the AP 400 and the PC 300 described below. The camera 100 of the present embodiment is capable of transmitting and receiving data with an external device via the first communication unit 111. For example, image data generated by the image capturing unit 102 may be transmitted to an external device via the first communication unit 111. Note that in the present embodiment, the first communication unit 111 includes an interface for communicating via a wireless LAN with an external device in accordance with IEEE 802.11 standards. The control unit 101 implements a wireless communication with an external device by controlling the first communication unit 111. Note that the communication method is not limited to a wireless LAN, and other methods may include an infrared communication interface, a wireless communication interface such as wireless USB, or a wired communication interface, such as a USB cable, HDMI (registered trademark), or IEEE 1394, for example.

A second communication unit 112, for example, includes an antenna for wireless communication and a modulation/demodulation circuit or a communication controller for processing wireless signal. The second communication unit 112 outputs a modulated wireless signal from the antenna or demodulates a wireless signal received by the antenna to implement short-range wireless communication in accordance with IEEE 802.15 standards (Bluetooth (registered trademark)). In the present embodiment, communications using Bluetooth (registered trademark) use Bluetooth (registered trademark) Low Energy (BLE) version 4.0, which has low power consumption. Communications using Bluetooth (registered trademark) have a narrower communicable range than communications using a wireless LAN (in other words, have a shorter communicable distance). Also, communications using Bluetooth (registered trademark) have slower communication speeds than communications using a wireless LAN. However, communications using Bluetooth (registered trademark) have a lower power consumption than communications using a wireless LAN.

The camera 100 of the present embodiment is capable of transmitting and receiving data with an external device via the second communication unit 112. For example, when the control unit 101 receives an image capture instruction from an external device, the control unit 101 controls the image capturing unit 102 and performs an image capture operation and the like, and when the control unit 101 receives an instruction to control the transmitting and receiving of data using a wireless LAN, the control unit 101 controls the first communication unit 111 and performs a communication operation and the like.

Note that the first communication unit 111 of the camera 100 of the present embodiment has an access point (AP) mode for operating as an access point in the infrastructure mode and a client (CL) mode for operating as a client in infrastructure mode. Also, when the first communication unit 111 operates in CL mode, the camera 100 of the present embodiment is capable of operating as a CL device in infrastructure mode. When the camera 100 is operating as a CL device, the camera 100 is capable of joining a network created by an AP device by connecting to an AP device nearby. Also, when the first communication unit 111 operates in AP mode, the camera 100 of the present embodiment is capable of operating as a simple AP (hereinafter, simple AP), which is a type of AP with limited functionality. When the camera 100 operates as a simple AP, the camera 100 itself creates a network. A device near the camera 100 can recognize the camera 100 as an AP device and join the network created by the camera 100. A program for causing the camera 100 to operate as described above is stored in the non-volatile memory 103.

Note that although the camera 100 of the present embodiment is a type of AP, it is a simple AP without a gateway function for transferring data received from a CL device to an internet provider or the like. Accordingly, the camera 100 is not capable of transferring data received from another device joined to the network created by the camera 100 to a network such as the Internet.

Figure 2:
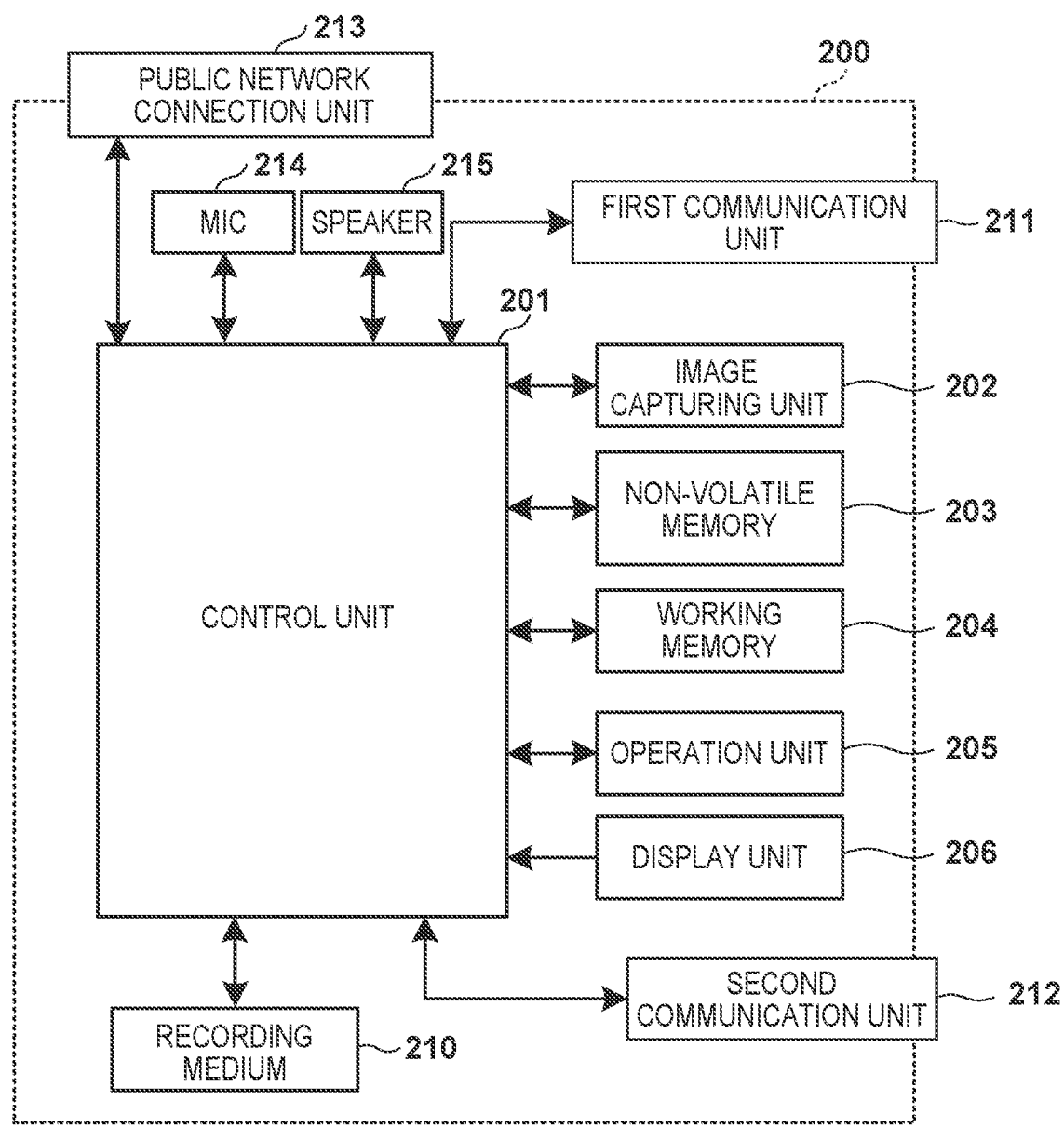
FIG. 2 is a block diagram illustrating the configuration of a communication apparatus according to the present embodiment.

FIG. 2 is a block diagram illustrating the configuration of the smart device 200 according to the present embodiment. Note that in the description below, a smart device is used as an example of the communication apparatus. However, no such limitation is intended, and other examples includes a desktop PC, a tablet PC, a wrist watch type smartwatch, glasses type smart glasses, and similar devices that are able to communicatively connect to the camera 100.

The smart device 200 of the present embodiment is provided with a control unit 201, an image capturing unit 202, a non-volatile memory 203, a working memory 204, an operation unit 205, a recording medium 210, a first communication unit 211, and a second communication unit 212. The basic functions of these elements are the same as in the camera 100, and thus the description will be omitted.

An operating system (OS), which is fundamental software executed by the control unit 201, and applications that cooperate with the OS to implement practical functions are recorded in the non-volatile memory 203. Also, in the present embodiment, applications for communicating with the camera 100 are stored in the non-volatile memory 203.

The processing of the smart device 200 of the present embodiment is implemented by reading software provided by an application. Note that in this example, the application includes software for using the basic function of the OS installed in the smart device 200. Also, the OS of the smart device 200 may include software for implementing the processing of the present embodiment.

The operation unit 205 includes various switches, buttons, a touch panel, and other operation members for accepting various operations from a user. The operation unit 205 includes a power button for turning on and off the power supply, for example. Also, the operation unit 205 includes a dedicated connection button for starting communications with the camera 100 or the PC 300 described below, which are external devices. Also, a touch panel integrally formed in a display unit 206 described below is included in the operation unit 205.

The display unit 206 displays live view images while capturing images, displays captured images, displays a UI screen for interactive operations, and the like. The display unit 206 is a liquid crystal display, an organic EL display, or a similar display device, for example. The display unit 206 may be integrally formed with the smart device 200 or may be an external device connected to the smart device 200. It is only required that the smart device 200 is capable of connecting to the display unit 206 and has a function for controlling the display of the display unit 206.

The first communication unit 211 includes a wireless communication interface for wirelessly communicating with an external device such as the camera 100. The control unit 201 implements a wireless communication with an external device by controlling the first communication unit 211. Note that the first communication unit 211 may be directly connected to the camera 100 or may be connected via an access point. As the protocol for communicating data, Hyper Text Transfer Protocol (HTTP) or Picture Transfer Protocol over Internet Protocol (PTP/IP) via a wireless LAN may be used, for example. Note that the communication with the camera 100 is not limited thereto. For example, the first communication unit 211 may include an infrared communication interface, a wireless communication interface such as wireless USB, or a wired communication interface, such as a USB cable, HDMI (registered trademark), or IEEE 1394.

A public network connection unit 213 is an interface used when wireless communication is performed via a wide area network (WAN), such as 4G/LTE, 5G, or the like. The smart device 200 is capable of calling another apparatus and communicating data via the public network connection unit 213. When calling, the control unit 201 performs input and output of audio signal via a microphone 214 and a speaker 215. In the present embodiment, the public network connection unit 213 is not limited to 4G/LTE and 5G and another communication method, such as Local 5G, WiMAX, ADSL, or FTTH may be used. In the present embodiment, the public network connection unit 213 is an antenna, and the control unit 201 can connect to the public network via the antenna. Note that a single antenna may function as both the first communication unit 211 and the public network connection unit 213. Note that the first communication unit 211 and the public network connection unit 213 are not required to be configured by independent hardware and may both be implemented via a single antenna, for example.

Figure 3:
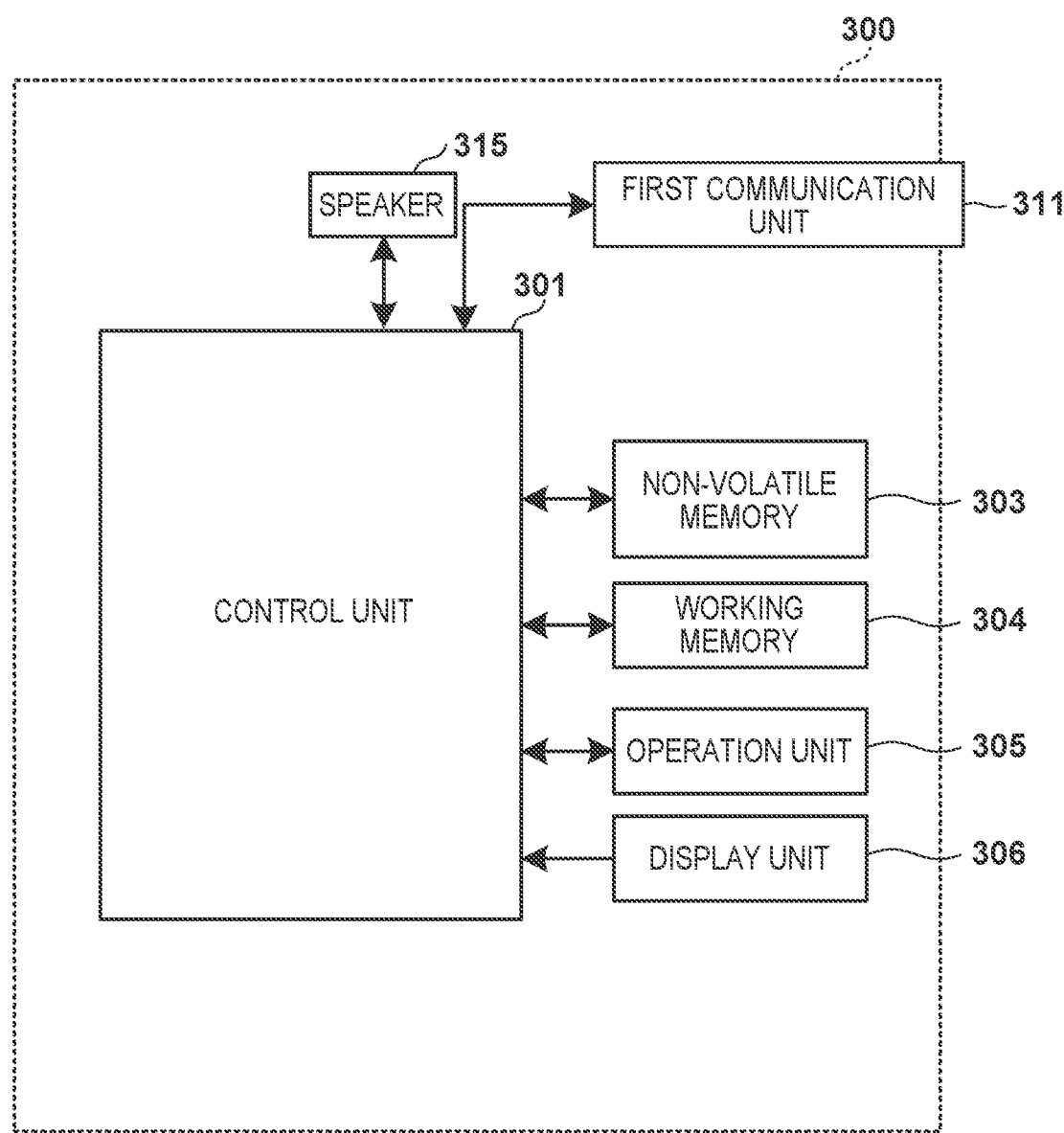
FIG. 3 is a block diagram illustrating the configuration of an external apparatus according to the present embodiment.

FIG. 3 is a block diagram illustrating the configuration of the PC 300 according to the present embodiment. Note that in the description below, a desktop PC is used as an example of the information processing apparatus. However, no such limitation is intended, and other examples includes a television, a tablet PC, a smart device, a wrist watch type smartwatch, glasses type smart glasses, and similar devices that are able to receive an image transferred from the camera 100 via a network.

The PC 300 of the present embodiment is provided with a control unit 301, a non-volatile memory 303, a working memory 304, an operation unit 305, a display unit 306, a first communication unit 311, and a speaker 315. The basic functions of these elements are the same as in the smart device 200, and thus the description will be omitted.

Network Configuration

Next, the network configuration when the camera 100 of the present embodiment acquires connection information from the smart device 200 and connects to the PC 300 and the AP 400 will be described with reference to FIGS. 4A and 4B.

Figure 4A:
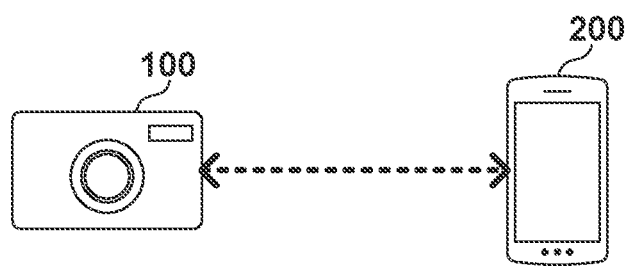
FIGS. 4A and 4B are network configuration diagrams according to the present embodiment.
Figure 4B:
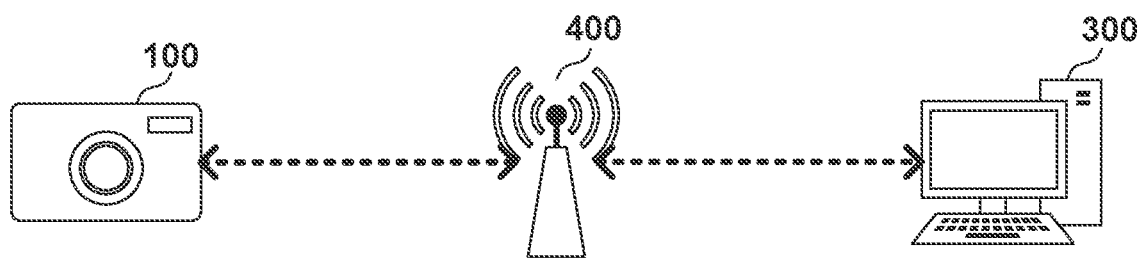

FIGS. 4A and 4B are diagrams for illustrating the network configuration when the camera 100 of the present embodiment acquires connection information from the smart device 200 and connects to the PC 300 and the AP 400.

Because the camera 100 of the present embodiment is not provided with a display unit, the user cannot directly input connection information for connecting to a wireless LAN into the camera 100 and cannot confirm the settings. Thus, in the present embodiment, settings are set via the smart device 200 using the connection information for the camera 100 to connect to the AP 400 and the PC 300.

FIG. 4A is a diagram illustrating an example of the network configuration when the camera 100 and the smart device 200 are direct connected, allowing for the transmission and reception of connection information for the camera 100 to connect to the AP 400 and the PC 300. FIG. 4B is a diagram illustrating an example of the network configuration when the camera 100 and the PC 300 are connected to a wireless LAN formed by the AP 400.

In FIG. 4A, the camera 100 operates as a simple AP, forms a wireless LAN network, and starts periodically transmitting a beacon signal. The smart device 200 detects the beacon signal and joins the wireless LAN network formed by the camera 100. After the smart device 200 has joined the wireless LAN network operated by the camera 100 as a simple AP, the apparatuses discover one another and, after apparatus capability acquisition, establish a connection and enter a state in which data can be transmitted and received.

As illustrated in FIG. 4B, the camera 100 and the PC 300 join the wireless LAN network formed by the AP 400. The camera 100 and the PC 300 detect a beacon signal periodically transmitted by the AP 400 and join the wireless LAN network formed by the AP 400. After the camera 100 and the PC 300 join the same wireless LAN network formed by the AP 400, the apparatuses discover one another and, after apparatus capability acquisition, enter a state in which data can be transmitted and received via the wireless LAN.

In the present embodiment, the smart device 200 transmits the connection information for connecting to the AP 400 to the camera 100, and the camera 100 uses the connection information acquired from the smart device 200, allowing it to join the wireless LAN network. Note that in the present embodiment, the connection information is an SSID and a password, but the connection information is not limited thereto. The connection information may be information including a wireless LAN channel, an encryption method, and the like and is only required to be information for connecting to the wireless LAN network. Also, the connection information may include authentication information (account information), such as a user (account) name, a user (account) password, and the like, for the PC 300 to connect to the camera 100 via the AP 400.

The present embodiment described herein uses a configuration in which a HTTP authentication (Basic Authentication or Digest Authentication) method is used when the PC 300 performs data communication with the camera 100. The smart device 200 transmits a user name and the user password for the PC 300 to connect to the camera 100 in a similar manner to the SSID and password. When the camera 100 connects to the PC 300 via the AP 400, the camera 100 uses the user name and the user password to determine whether or not to allow access to the PC 300.

Hereinafter, the connection information includes a communication parameter including an S SID and a password used in wireless LAN connection and authentication information including a user name and a user password used in authenticating an apparatus connected via the wireless LAN.

Connection Information Setting and Updating

Next, a method for setting the connection information for the camera 100 of the present embodiment to connect to the PC 300 and the AP 400 after acquiring the connection information from the smart device 200 and a method for updating the connection information when the connection information of the AP 400 is changed will be described with reference to FIGS. 5A to 5D.

FIGS. 5A to 5D are diagrams illustrating examples of UI screens of the smart device 200 when the camera 100 of the present embodiment acquires the connection information from the smart device 200 and connects to the PC 300 and the AP 400. FIGS. 6A to 6D are sequence diagrams for illustrating the method in which the camera 100 of the present embodiment acquires connection information from the smart device 200 and connects to the PC 300 and the AP 400.

Figure 5B:
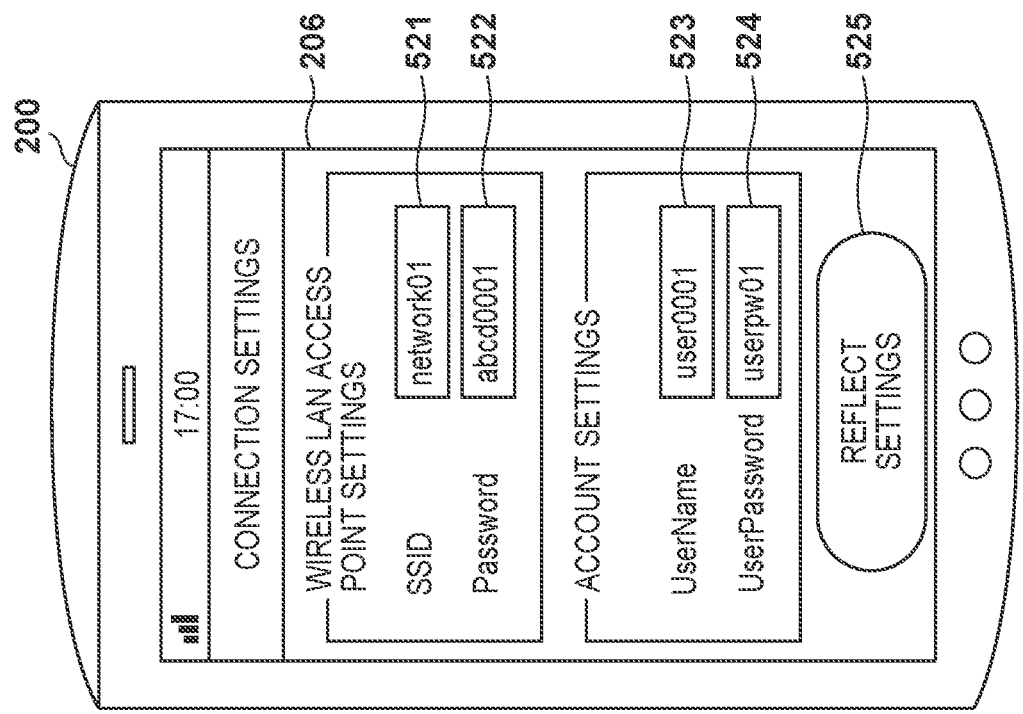
FIGS. 5A to 5D are diagrams illustrating examples of UI screens of the communication apparatus according to the present embodiment.
Figure 5A:
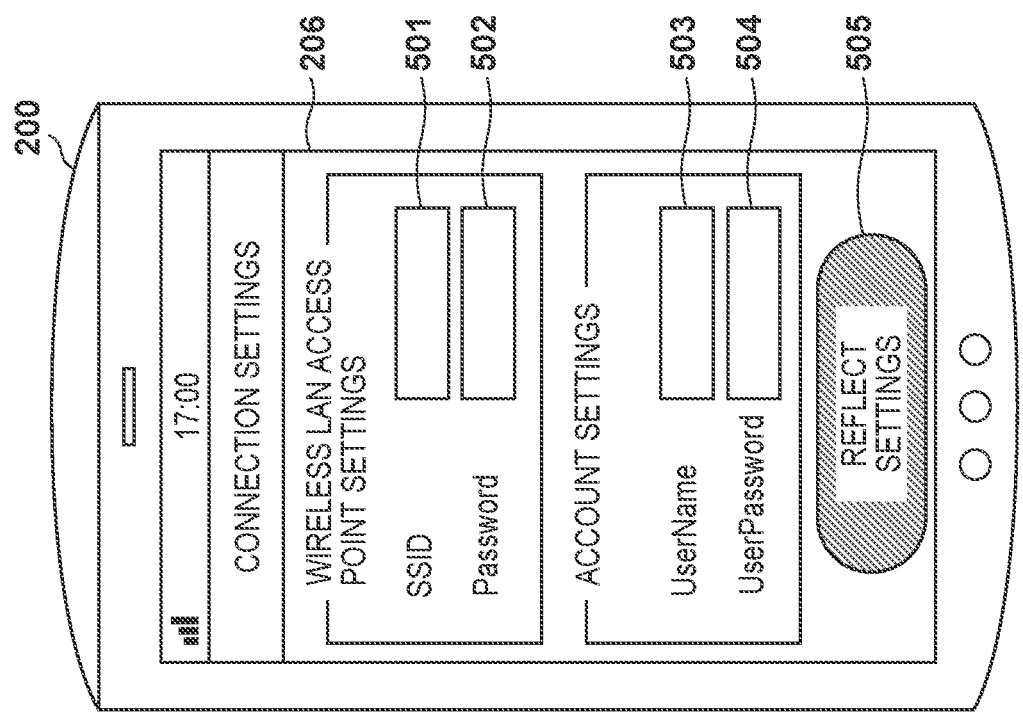
Figure 6A:
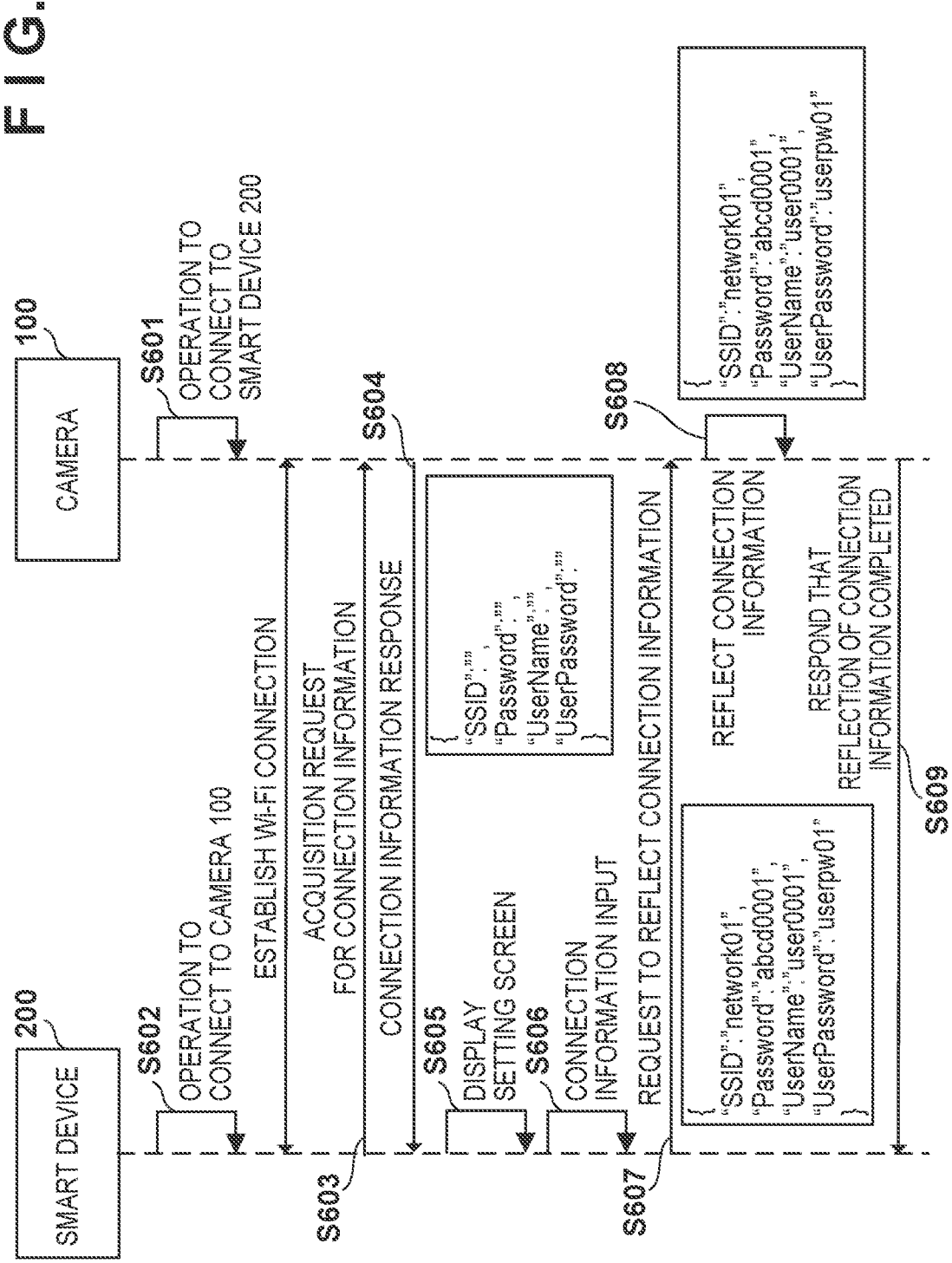

FIG. 5A is a diagram illustrating an example of a UI screen of the smart device 200 when the connection information of the AP 400 is not set for the camera 100. FIG. 5B is a diagram illustrating an example of a UI screen of the smart device 200 in a state in which the connection information for setting the camera 100 has been input. FIG. 6A is a sequence diagram for illustrating a method for setting the connection information when the connection information is not set for the camera 100.

The method for setting the connection information for the camera 100 will now be described with reference to FIGS. 5A, 5B, and 6A.

As illustrated in FIG. 6A, in step S601, when there is an operation to connect to the smart device 200 by a user via the operation unit 105 of the camera 100, the camera 100 operates as a simple AP and forms a wireless LAN network.

In step S602, when the user performs an operation to connect to the camera 100 via the operation unit 205 of the smart device 200, the smart device 200 joins the wireless LAN network formed by the camera 100 and establishes a Wi-Fi (registered trademark) connection.

In step S603, the smart device 200 transmits an acquisition request for the connection information as the connection settings to the camera 100 via the first communication unit 211. In this case, since the camera 100 has not been set with the connection information, in step S604, the camera 100 transmits a response of an empty value as the connection information. The camera 100 of the present embodiment responds with an empty value when the connection information is not set, but no such limitation is intended. It is sufficient that, when the connection information is not set, the camera 100 responds with information that allows the smart device 200 to recognize that the camera 100 has not been set with the connection information. For example, the response may be an error value indicating that the connection information has not been set.

In step S605, the smart device 200 displays the UI screen illustrated in FIG. 5A on the display unit 206.

The UI screen of FIG. 5A will now be described. An input field 501 is a text box for displaying and entering, of the connection information of the camera 100, an SSID. An input field 502 is a text box for displaying and entering, of the connection information of the camera 100, a password. An input field 503 is a text box for displaying and entering the authentication information of the camera 100, specifically a user name. An input field 504 is a text box for displaying and entering the authentication information of the camera 100, specifically a password. A button 505 is a button for transmitting a request from the smart device 200 to the camera 100 to reflect the connection information. In FIG. 5A, since the connection information acquired from the camera 100 is not set, the input fields 501 to 504 are blank. Also, since the connection information has not been entered, the button 505 is displayed grayed out indicating that, in this state, a request for reflecting the connection information cannot be sent to the camera 100.

In step S606, when the user enters the connection information via the operation unit 205 of the smart device 200, the UI screen illustrated in FIG. 5B is displayed on the display unit 206 of the smart device 200. Input fields 521 to 524 and a button 525 are the same as the input fields 501 to 504 and the button 505 in FIG. 5A. The input fields 521 to 524 are displayed with the data entered in step S606, and the button 525 is no longer displayed grayed out, indicating that, in this state, the connection information has been entered and a request to reflect the connection information can be sent to the camera 100.

Note that in the example of FIG. 5B, the password entered in the input field 522 and the user password entered in the input field 524 are displayed as is with the entered characters unchanged. However, to prevent leakage due to the displayed screen being seen, the entered characters may not be displayed, and it may be only shown that characters have been entered. Specifically, when each character is entered, a '*' is displayed. Accordingly, even when the password has been entered on the screen, there is only a line of concealed characters. This can reduce the possibility of the password being leakage due to screen being seen.

Also, when the same concealed character '*' is used in the UI screen illustrated in FIG. 5C described below, there is a possibility that this will not be able to be distinguished from that used in a case such as that illustrated by the UI screen of FIG. 5C in which the information has not been acquired from the camera 100. Thus, the concealed character used when a password has been entered may be different from the concealed character used when the information has not been acquired from the camera 100. For example, '●' may be displayed or the same character '*' may be displayed but in bold, underlined, or italicized. In this manner, by using the same character as the character displayed on the screen when the connection information has not been acquired but using display appearances such as fonts of different style, a display indicating that the information is wished to be kept confidential and a display indicating that it is entered information can both be achieved.

In step S607, when the user operates the button 505 via the operation unit 205 of the smart device 200, a request for reflecting connection information is transmitted to the camera 100. The smart device 200 transmits the connection information to the camera 100 via the first communication unit 211.

In step S608, the camera 100 updates the connection information stored in the non-volatile memory 103 with the connection information received from the smart device 200 via the first communication unit 111.

In step S609, the camera 100 transmits a response indicating that reflection of the connection information has been completed to the smart device 200 via the first communication unit 111. In the present embodiment, the connection information to be set illustrated in FIG. 6A includes 'network01' as the SSID, 'abcd0001' as the password, 'user0001' as the user name, and 'userpw01' as the user password.

With this process, when the camera 100 is not set with the connection information, the camera 100 can be set with the connection information using the smart device 200.

Next, a method for connecting to the AP 400 and the PC 300 when the camera 100 is set with connection information will be described. Here, the connection information of the AP 400 is set to the same of the connection information set for the camera 100, and the AP 400 operates with 'network01' as the SSID and 'abcd0001' as the password.

FIG. 6B is a sequence diagram for illustrating a method for connecting to the AP 400 and the PC 300 when the connection information is set for the camera 100. Note that the process of establishing a Wi-Fi (registered trademark) connection with the PC 300 and the AP 400 will not be described.

In step S621, when there is an operation to connect to the AP 400 by a user via the operation unit 105 of the camera 100, in step S622, the camera 100 detects a beacon signal periodically transmitted by the AP 400. The beacon signal is the SSID 'network01' set as the connection information as illustrated in FIG. 6A. When the AP 400 periodically transmits the beacon signal of the SSID 'network01' and the beacon signal is detected by the camera 100, in step S623, an authentication request is sent to the AP 400 using the password 'abcd0001' of the connection information.

In step S624, since the password used to send an authentication request to the AP 400 matches the set password, an authentication success response is sent to the camera 100, and a Wi-Fi (registered trademark) connection is established.

In step S625, the PC 300 transmits a communication request to the camera 100 via the first communication unit 311. Here, when the PC 300 sends the communication request, a screen prompt for the user name and the user password to be entered is displayed on the display unit 306.

In step S626, the camera 100 performs HTTP authentication using the user name and the user password transmitted from the PC 300 and the user name and the user password stored in the camera 100 and sends a response to the connection request. The contents of the communication between the camera 100 and the PC 300 can be expected to relate to the transfer of real time images or recorded images from the camera 100 to the PC 300, for example.

According to this process, the camera 100 can connect to the AP 400 and the PC 300 by using the connection information set for the smart device 200.

In some cases, the connection information of the AP 400 may be changed by a user. When the connection information is changed, the connection information stored by the camera 100 and the connection information of the AP 400 become different. Thus, the camera 100 becomes unable to connect to the AP 400. Specifically, when the SSID of the connection information of the AP 400 is changed, in step S622 in FIG. 6B, the camera 100 is unable to detect the beacon signal of the AP 400. Also, when the password of the connection information of the AP 400 is changed, a response of authentication failure is sent in step S624 in response to the authentication request of step S623 in FIG. 6B, and a connection between the camera 100 and the AP 400 cannot be established. An operation to update the connection information of the AP 400 set for the camera 100 by re-entering all of the connection information using the smart device 200 takes the trouble for the user. A conceivable alternative includes a method including the smart device 200 acquiring the connection information already set for the camera 100 from the camera 100 and displaying the connection information, thus omitting the process of entering. However, acquiring the password and the user password via wireless communication leaves open the possibility of leakage, theft, and the like. Thus, in the present embodiment, when the connection information of the AP 400 stored in the camera 100 is updated using the smart device 200, an update process is performed without acquiring the password and the user password.

Next, the process when, of the connection information of the AP 400, the SSID is changed will be described with reference to FIGS. 5C and 6C. FIG. 5C is a diagram illustrating an example of a UI screen of the smart device 200 when, of the connection information of the AP 400, the SSID is changed. FIG. 6C is a sequence diagram for illustrating the operations of the camera 100 and the smart device 200 when, of the connection information of the AP 400, the SSID is changed to 'network02'.

As illustrated in FIG. 6C, in step S641, when there is an operation to connect to the smart device 200 by a user via the operation unit 105 of the camera 100, the camera 100 operates as a simple AP and forms a wireless LAN network.

In step S642, when the user performs an operation to connect to the camera 100 via the operation unit 205 of the smart device 200, the smart device 200 joins the wireless LAN network formed by the camera 100 and establishes a Wi-Fi (registered trademark) connection.

In step S643, the smart device 200 transmits an acquisition request for the connection information to the camera 100 via the first communication unit 211.

In step S644, the camera 100 responds with the connection information via the first communication unit 111. Here, a response is sent including the character string 'null' for, of the connection information, the password of the communication parameter and the user password of the authentication information. 'Null' is originally an empty value, in other words a character string meaning 'not set', but in the present embodiment, it means that the information is already set for the camera 100 but has not been transmitted by the camera 100. Note that in the present embodiment, a response is sent including the character string 'null' for, of the connection information, the password of the communication parameter and the user password of the authentication information. However, no such limitation is intended. For example, it is sufficient that a response is sent including information that allows the smart device 200 to recognize that the smart device 200 has not acquired the password and the user password because the password and the user password are already set for the camera 100 but the camera 100 has not transmitted them. For example, the number of characters of the password and the user password may be sent as a response.

Figure 5C:
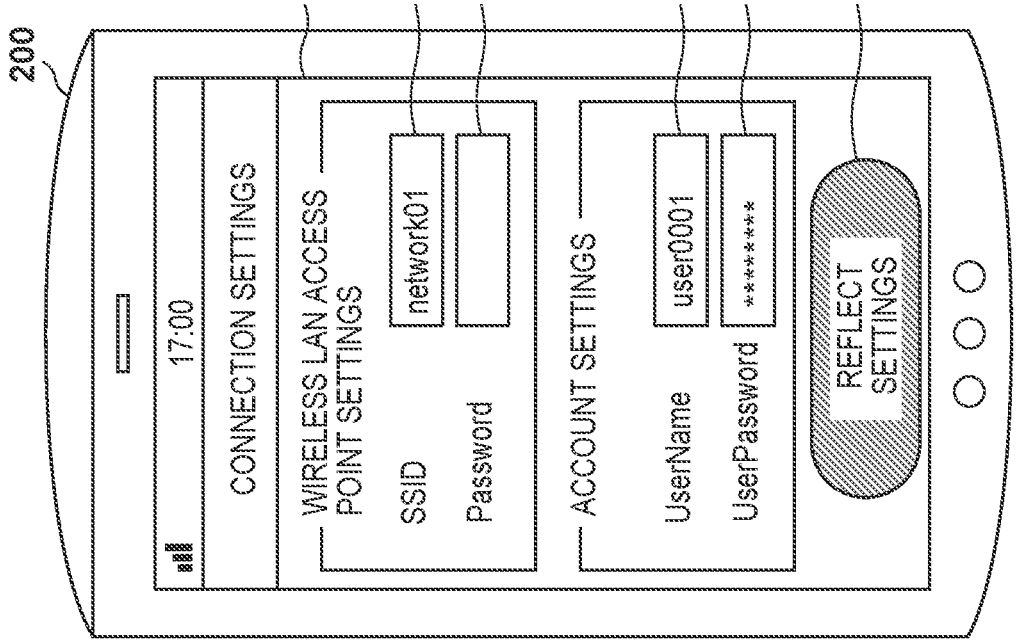

In step S645, the smart device 200 displays the UI screen illustrated in FIG. 5C on the display unit 206. Input fields 541 to 544 and a button 545 are the same as the input fields 501 to 504 and the button 505 in FIG. 5A. The SSID and the user name acquired from the camera 100 are displayed in the input fields 541 and 543. Also, specific information that is not the password and the user password and includes characters or symbols that make the password and the user password contents unrecognizable is displayed in the input fields 542 and 544. Also, the specific information is displayed as information, for example, in the present embodiment a character string of asterisks ('********'), that allow the user to identify that the information is already set for the camera 100 but has not been acquired from the camera 100.

Note that the specific information is not limited thereto, and the color of the input fields 542 and 544 may be changed or the specific information may be displayed by the number of characters of the password and the user password acquired from the camera 100, for example.

In step S646, the user enters 'network02' for the SSID in the input field 541 via the operation unit 205 of the smart device 200. Note that when the camera 100 cannot detect the beacon signal of the AP 400, the smart device 200 may be notified that the beacon signal cannot be detected and this may be displayed on the display unit 206 of the smart device 200. In this manner, the user can be made to realize that information needs to be entered in the input field 541.

In step S647, when the user operates the button 545 via the operation unit 205 of the smart device 200, the smart device 200 transmits a request for reflecting the connection information to the camera 100. The smart device 200 transmits the connection information to the camera 100 via the first communication unit 211. Here, a response is sent including the character string 'null' for, of the connection information, the password of the communication parameter and the user password of the authentication information. 'Null' is originally an empty value, in other words a character string meaning 'not set', but in the present embodiment, it means that the setting of the camera 100 is not updated.

In step S648, when the connection information is received from the smart device 200 via the first communication unit 111, the camera 100 stores the connection information in the non-volatile memory 103. In this case, the camera 100 updates the item with the changed information, from among the connection information received from the smart device 200, from the already set item and leaves the 'null' item as is as an already set item without updating the information.

In step S649, the camera 100 responds indicating that reflection of the connection information has been completed to the smart device 200 via the first communication unit 111. In the present embodiment, the connection information to be set illustrated in FIG. 6C includes 'network02' as the SSID, 'abcd0001' as the password, 'user0001' as the user name, and 'userpw01' as the user password.

In this manner, when the connection information of the AP 400 already set for the camera 100 is changed using the smart device 200, the communication parameter password and the authentication information user password are not acquired from the camera 100. This reduces the trouble when the user enters the connection information of the camera 100 into the smart device 200 in order to maintain confidentiality regarding the connection information when wireless communication is performed by the camera 100 and the smart device 200.

Next, the process when, of the communication parameters of the AP 400, the password is changed will be described with reference to FIGS. 5D and 6D.

Figure 5D:
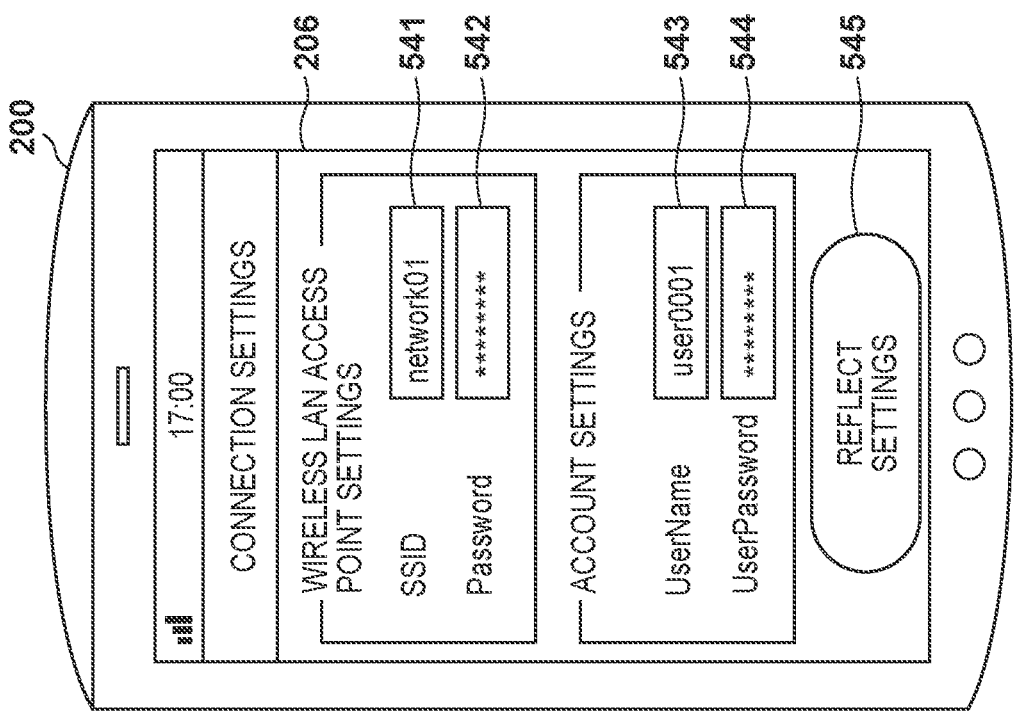

FIG. 5D is a diagram illustrating an example of a UI screen of the smart device 200 when, of the communication parameters of the AP 400, the password is changed. FIG. 6D is a sequence diagram for illustrating the operations of the camera 100 and the smart device 200 when, of the communication parameters of the AP 400, the password is changed to 'abcd0002'.

Steps S661 to S665 are similar to steps S641 to S645.

In step S666, the user enters 'abcd0002' for the password of the communication parameter of the AP 400 in an input field 562 of the UI screen in FIG. 5D via the operation unit 205 of the smart device 200. In this case, when a user operation relating to the input field 562 is detected, to make the user realize that information needs to be entered in the input field 562, the specific information ('******') of the input field 562 is deleted and a blank field is displayed. Note that to make it even easier for the user to realize, when the camera 100 fails in authentication with the AP 400, the smart device 200 is notified that authentication failed, and that authentication failed may be displayed on the display unit 206 of the smart device 200**.

In step S667, when the user operates a button 565 via the operation unit 205 of the smart device 200, the smart device 200 transmits a request for reflecting the connection information to the camera 100 and the connection information including the 'abcd0002' entered in the input field 562 of the UI screen in FIG. 5D. Here, of the connection information transmitted to the camera 100, the user password of the authentication information of an input field 564 of the UI screen in FIG. 5D is transmitted using the character string 'null' indicating for there to be no change.

In step S668, the camera 100 updates the connection information stored in the non-volatile memory 103 with the connection information received from the smart device 200 via the first communication unit 111. In this case, the camera 100 updates the item with the changed information, from among the connection information received from the smart device 200, from the already set item and leaves the 'null' item as is as an already set item without updating the information.

In step S669, the camera 100 responds indicating that reflection of the connection information has been completed to the smart device 200 via the first communication unit 111. The connection information to be set illustrated in FIG. 6D includes 'network02' as the SSID, 'abcd0002' as the password, 'user0001' as the user name, and 'userpw01' as the user password.

In this manner, when the connection information of the AP 400 already set for the camera 100 is updated using the smart device 200, the communication parameter password and the authentication information user password are not acquired from the camera 100. This reduces the trouble when the user enters the connection information of the camera 100 into the smart device 200 in order to maintain confidentiality regarding the connection information when wireless communication is performed by the camera 100 and the smart device 200.

Note that in the present embodiment described herein, of the connection information, a communication parameter has been changed. However, the same applies when the user name or the user password of the authentication information has been changed.

Also, the AP 400 can set, of the communication parameters, the password to an unset state. In the case of setting the settings for connecting to the AP 400 in a state without a set password, for example, a request is transmitted from the smart device 200 to the camera 100 for reflecting the password of the communication parameter of the AP 400 as a blank character string to the connection information. By updating the connection information stored in the non-volatile memory 103 to the connection information of a blank character string password for the communication parameter of the AP 400 received from the smart device 200, the camera 100 can connect to the AP 400 without performing an authentication request with the AP 400.

Processing of Camera 100

Next, the processing of the camera 100 of the present embodiment to use the smart device 200 and connect to the AP 400 and the PC 300 will be described with reference to FIGS. 7A to 7C.

Figure 7A:
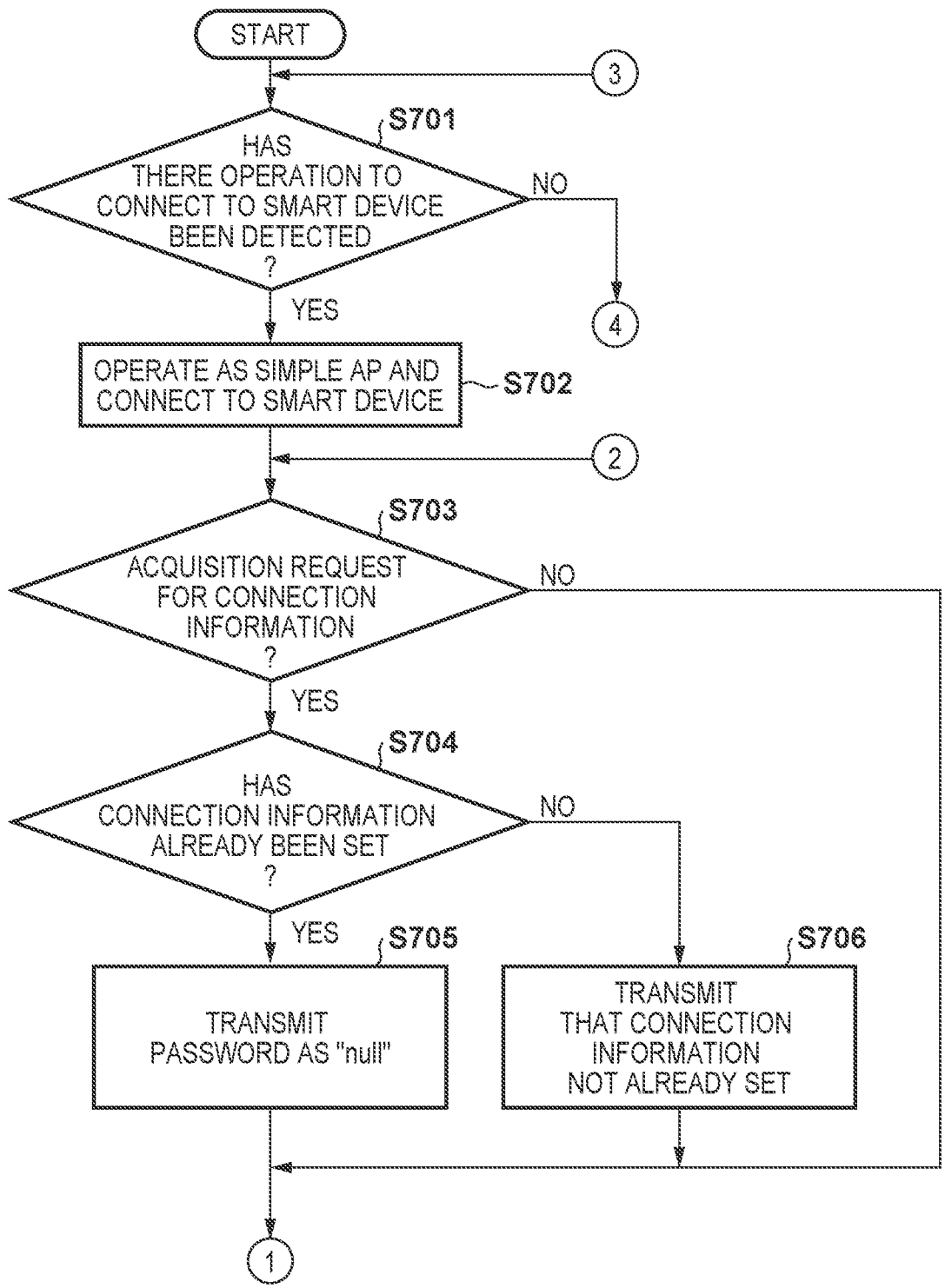
FIGS. 7A to 7C are flowcharts illustrating processing of the electronic apparatus according to the present embodiment.
Figure 7B:
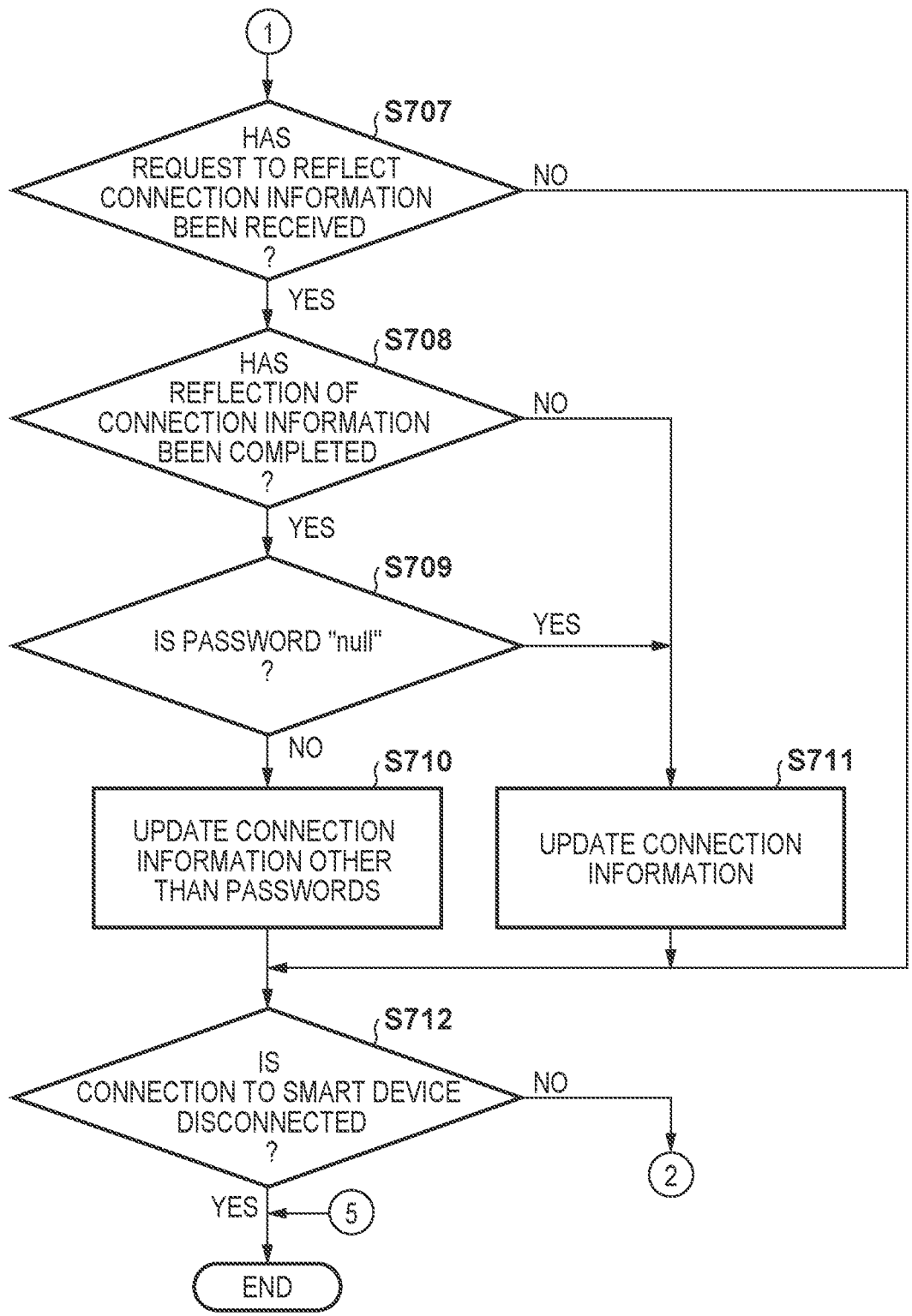
Figure 7C:
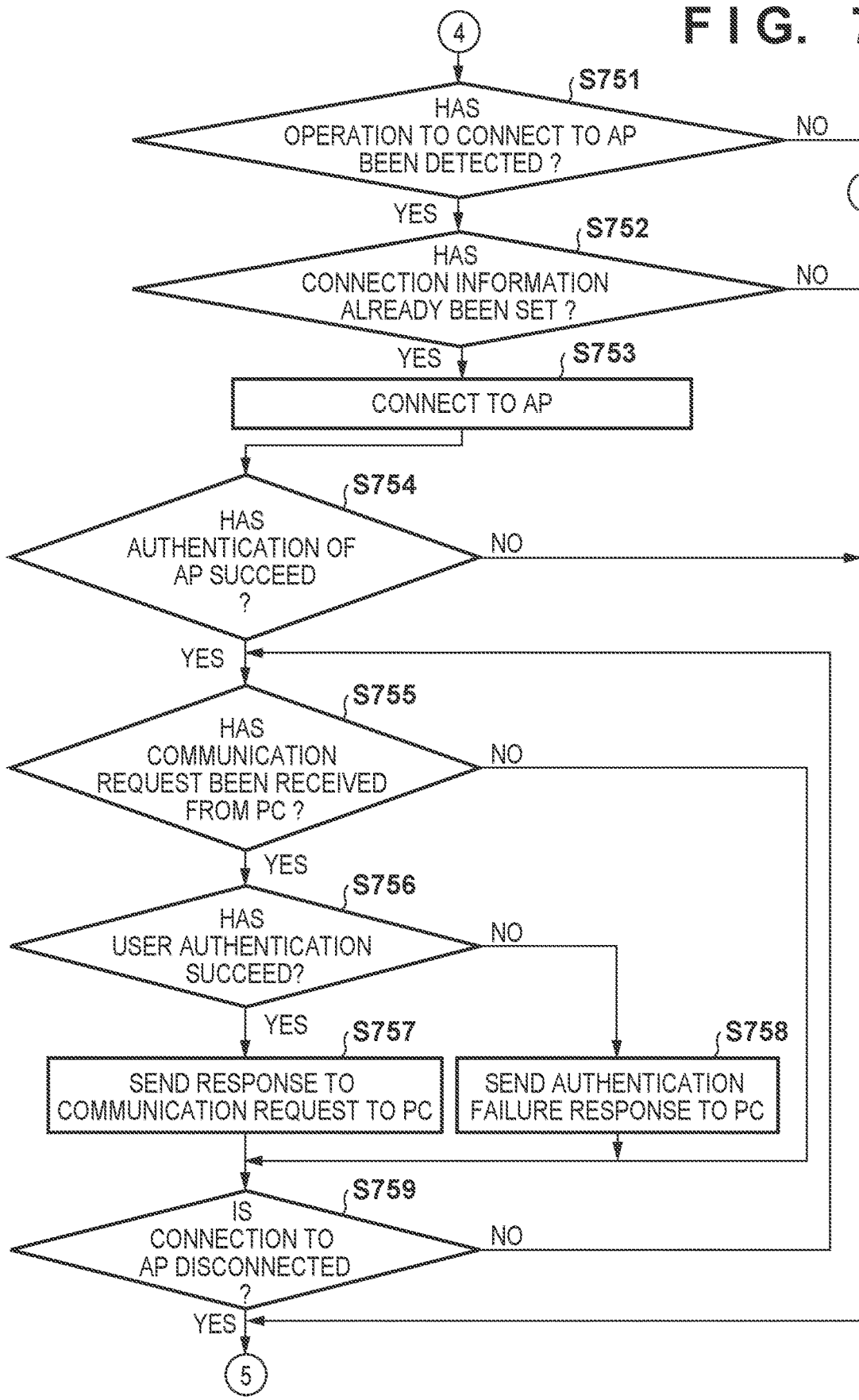

Note that the processing in FIGS. 7A to 7C is implemented by the control unit 101 of the camera 100 executing a program stored in the non-volatile memory 103 to control each component of the camera 100.

In step S701, the control unit 101 determines whether or not an operation by a user operating the operation unit 105 to connect to the smart device 200 has been detected. When the control unit 101 determines that an operation to connect to the smart device 200 has been detected, the control unit 101 proceeds the processing to step S702. When the control unit 101 determines that an operation to connect to the smart device 200 has not been detected, the control unit 101 proceeds the processing to step S751.

In step S751, the control unit 101 determines whether or not an operation by a user operating the operation unit 105 to connect to the AP 400 has been detected. When the control unit 101 determines that an operation to connect to the AP 400 has been detected, the control unit 101 proceeds the processing to step S752. When the control unit 101 determines that an operation to connect to the AP 400 has not been detected, the control unit 101 returns the processing to step S701. In this manner, the processing starts when triggered by an operation for the camera 100 to connect to the smart device 200 or an operation for the camera 100 to connect to the AP 400.

Steps S702 onward relating to the processing for connecting to the smart device 200 will be described next, and then steps S752 onward relating to the processing for connecting to the AP 400 will be described.

In step S702, the control unit 101 operates as a simple AP and forms a wireless LAN network to allow for connection to the smart device 200 via the first communication unit 111. Then, the smart device 200 joins the wireless LAN network formed by the camera 100, and a Wi-Fi (registered trademark) connection is established.

In step S703, the control unit 101 determines whether or not a request to acquire the connection information has been received from the smart device 200 via the first communication unit 111. The connection information includes an SSID and password as communication parameters and a user name and user password as authentication information. When the control unit 101 determines that a connection information acquisition request has been received from the smart device 200, the control unit 101 proceeds the processing to step S704. When the control unit 101 determines that a connection information acquisition request has not been received from the smart device 200, the control unit 101 proceeds the processing to step S707.

In step S704, the control unit 101 determines whether or not the connection information has already been set. When the control unit 101 determines that the connection information has already been set, the control unit 101 proceeds the processing to step S705. When the control unit 101 determines that the connection information has not already been set, the control unit 101 proceeds the processing to step S706.

In step S705, the control unit 101 converts, of the already set connection information, the password of the communication parameter and the user password of the authentication information to a 'null' character string indicating that the information is already set for the camera 100 but the camera 100 has not transmitted the information. The control unit 101 transmits the communication parameters including the SSID and the password converted to 'null' and the authentication information including the user name and the user password converted to 'null' as the connection information to the smart device 200 via the first communication unit 111.

Accordingly, the camera 100 does not transmit to the smart device 200, of the already set connection information, the password of the communication parameter and the user password of the authentication information, thus maintaining the confidentiality of the connection information.

In step S706, the control unit 101 transmits to the smart device 200 via the first communication unit 111 that the connection information is not already set. An example of a method for notifying that the connection information is not already set includes transmitting information indicating that each item of the connection information is a blank field.

In step S707, the control unit 101 determines whether or not a request for reflecting the connection information has been received from the smart device 200 via the first communication unit 111. When the control unit 101 determines that a connection information reflection request has been received from the smart device 200 via the first communication unit 111, the control unit 101 proceeds the processing to step S708. When the control unit 101 determines that a connection information reflection request has not been received from the smart device 200 via the first communication unit 111, the control unit 101 proceeds the processing to step S712.

In step S708, the control unit 101 determines whether or not reflection of the connection information has been completed. When the control unit 101 determines that the connection information reflection has been completed, the control unit 101 proceeds the processing to step S709. When the control unit 101 determines that the connection information reflection has not been completed, the control unit 101 proceeds the processing to step S711.

In step S709, the control unit 101 determines whether or not, of the connection information received from the smart device 200 via the first communication unit 111, the password of the communication parameter and the user password of the authentication information are a character string of 'null' indicating that they are not updated. When the control unit 101 determines that, of the connection information received from the smart device 200, the password of the communication parameter and the user password of the authentication information are a character string of 'null' indicating that they are not updated, the control unit 101 proceeds the processing to step S710. When the control unit 101 determines that, of the connection information received from the smart device 200, the password of the communication parameter and the user password of the authentication information are not a character string of 'null' indicating that they are not updated, the control unit 101 proceeds the processing to step S711.

In step S710, the control unit 101 updates the communication parameters without updating, of the connection information received from the smart device 200, the password of the communication parameter and the user password of the authentication information and stores these in the non-volatile memory 103.

In step S711, the control unit 101 updates the connection information stored in the non-volatile memory 103 with the connection information received from the smart device 200.

In step S712, the control unit 101 determines whether or not the connection with the smart device 200 is disconnected. When the control unit 101 determines that the connection with the smart device 200 is disconnected, the processing ends. When the control unit 101 determines that the connection with the smart device 200 is not disconnected, the control unit 101 returns the processing to step S703.

Next, the processing for connecting to the AP 400 from step S752 will be described.

In step S752, the control unit 101 determines whether or not the connection information is already set. When the control unit 101 determines that the connection information is already set, the control unit 101 proceeds the processing to step S753. When the control unit 101 determines that the connection information is not already set, since the AP 400 cannot be connected to, the processing ends.

In step S753, the control unit 101 detects the beacon signal periodically transmitted by the AP 400 via the first communication unit 111. When the AP 400 periodically transmits the beacon signal and the beacon signal is detected by the camera 100, of the connection information stored in the non-volatile memory 103, the password of the communication parameter is used to perform an authentication request.

In step S754, the control unit 101 determines whether or not a response of authentication success has been received from the AP 400 via the first communication unit 111. When the control unit 101 determines that a response of authentication success has been received from the AP 400 via the first communication unit 111, a Wi-Fi (registered trademark) connection is established, and then the control unit 101 proceeds the processing to step S755. When the control unit 101 determines that a response of authentication failure has been received from the AP 400 via the first communication unit 111, a Wi-Fi (registered trademark) connection cannot be established, and then the processing ends.

In step S755, the control unit 101 determines whether or not a communication request has been received from the PC 300 via the first communication unit 111. When the control unit 101 determines that a communication request has been received from the PC 300 via the first communication unit 111, the control unit 101 proceeds the processing to step S756. When the control unit 101 determines that a communication request has not been received from the PC 300 via the first communication unit 111, the control unit 101 proceeds the processing to step S759.

In step S756, the control unit 101 performs HTTP authentication using, of the connection information received from the PC 300 via the first communication unit 111, the authentication information. The control unit 101 transmits an authentication information request to the PC 300 via the first communication unit 111 and determines whether or not the user name and the user password received from the PC 300 match the user name and the user password stored in the non-volatile memory 103. When the user name and the user password received from the PC 300 match the user name and the user password stored in the non-volatile memory 103, the control unit 101 determines authentication to be successful, and the control unit 101 proceeds the processing to step S757. When the user name and the user password received from the PC 300 does not match the user name and the user password stored in the non-volatile memory 103, the control unit 101 determines authentication to be a failure, and the control unit 101 proceeds the processing to step S758.

In step S757, the control unit 101 transmits a response to the PC 300 communication request via the first communication unit 111.

In step S758, the control unit 101 transmits an authentication failure response to the PC 300 communication request via the first communication unit 111.

In step S759, the control unit 101 determines whether or not the connection with the AP 400 is disconnected. When the control unit 101 determines that the connection with the AP 400 is disconnected, the processing ends. When the control unit 101 determines that the connection with the AP 400 is not disconnected, the control unit 101 returns the processing to step S755, and the control unit 101 waits for a communication request from the PC 300.

Processing of Smart Device 200

Next, the processing of the smart device 200 of the present embodiment to set the connection information of the AP 400 for the camera 100 will be described with reference to FIGS. 8A and 8B.

Figure 8A:
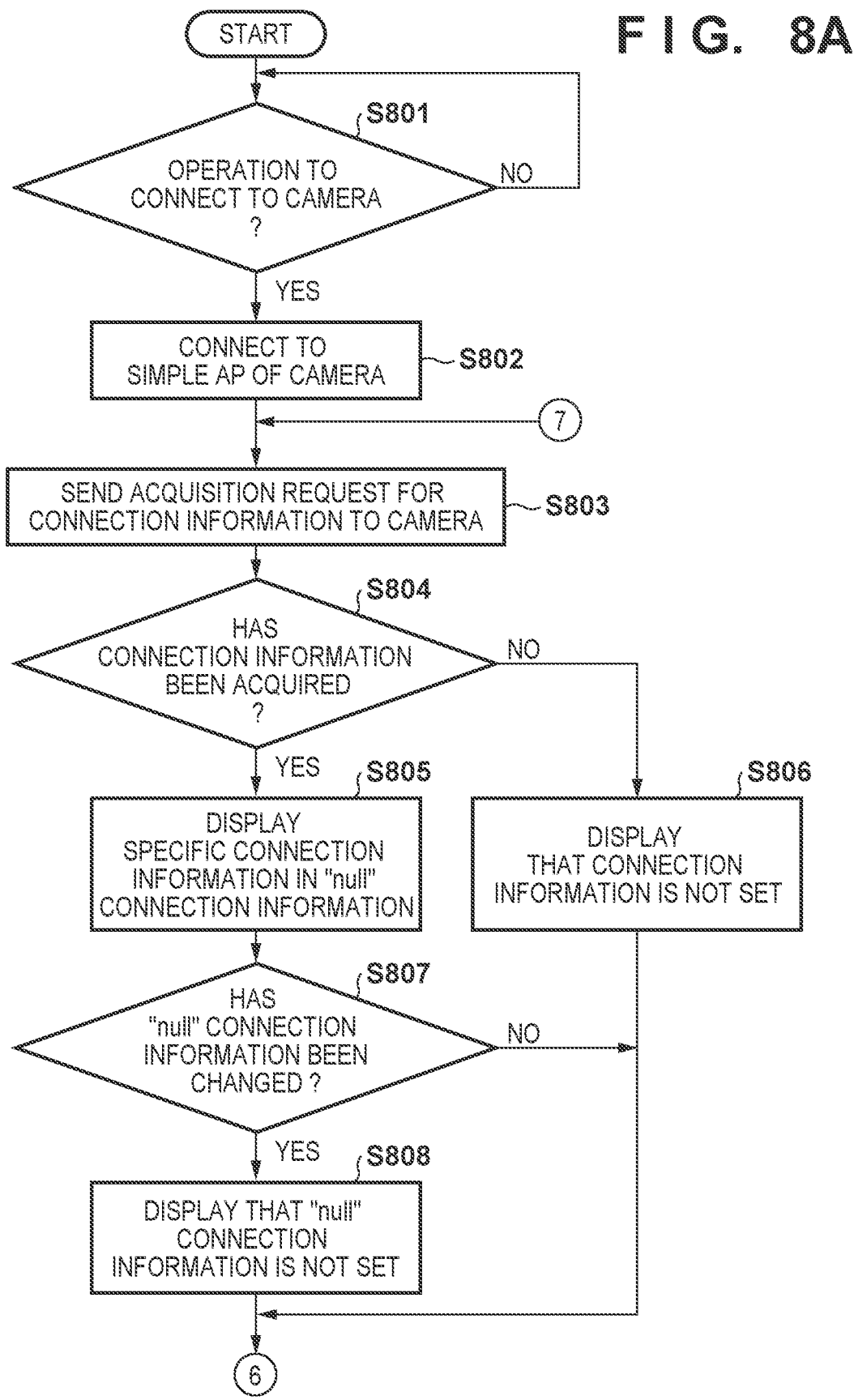
FIGS. 8A and 8B are flowcharts illustrating processing of the communication apparatus according to the present embodiment.
Figure 8B:
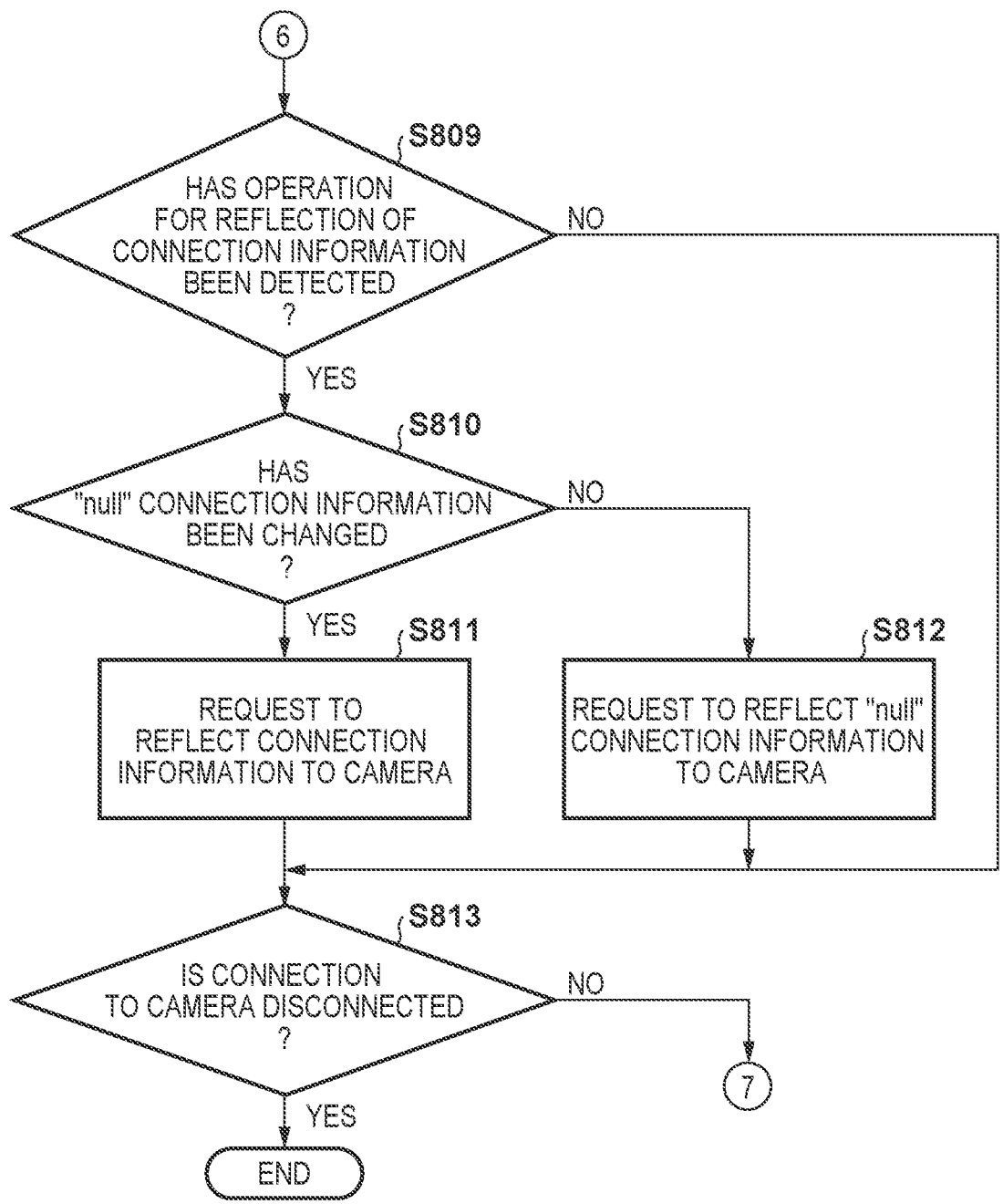

Note that the processing in FIGS. 8A and 8B are implemented by the control unit 201 of the smart device 200 executing a program stored in the non-volatile memory 203 to control each component of the smart device 200.

In step S801, the control unit 201 is on standby until an operation by a user operating the operation unit 205 to connect to the camera 100 has been detected. When the control unit 201 detects an operation to connect to the camera 100, the control unit 201 proceeds the processing to step S802.

In step S802, the control unit 201 joins the wireless LAN network formed by the camera 100 via the first communication unit 211, and a Wi-Fi (registered trademark) connection is established.

In step S803, the control unit 201 transmits an acquisition request for the connection information to the camera 100 via the first communication unit 211. The smart device 200 can acquire the already set information from the camera 100 and acquire information indicating that the information that is not already set is a blank field.

In step S804, the control unit 201 determines whether or not the connection information has been acquired from the camera 100 via the first communication unit 211. When the control unit 201 determines that the connection information has been acquired from the camera 100, the control unit 201 proceeds the processing to step S805. When the control unit 201 determines that the connection information has not been acquired from the camera 100, the control unit 201 proceeds the processing to step S806.

In step S805, the control unit 201 displays the UI screen illustrated in FIG. 5C on the display unit 206. Of the connection information received from the camera 100, information of 'null' indicating that the smart device 200 has not acquired the information due to the information being already set for the camera 100 but the camera 100 not having transmitted it is displayed on the display unit 206 as specific information ('********') as illustrated in the input fields 542 and 544 in FIG. 5C, and the information other than the 'null' information is displayed unchanged from the manner it has been acquired.

In step S806, the control unit 201 displays the UI screen illustrated in FIG. 5A on the display unit 206 to notify the user that the connection information is not set for the camera 100, and then the control unit 201 proceeds the processing to step S809.

In step S807, the control unit 201 determines whether or not a user operation relating to the input fields 542 and 544 displaying the specific information ('********') on the UI screen in FIG. 5C has been detected. When the control unit 201 determines that a user operation has been detected, the control unit 201 proceeds the processing to step S808. When the control unit 201 determines that a user operation has not been detected, the control unit 201 proceeds the processing to step S809.

A case in which an operation to change the password of the input field 542 on the UI screen in FIG. 5C is detected will be described below.

In step S808, the input field 542 displaying the specific information ('******') as on the UI screen in FIG. 5C is changed by the control unit 201 to the display of a blank field indicating that the connection information is not set and that connection information can be entered as in the input field 502 on the UI screen in FIG. 5A. This is to ensure that the specific information ('******') displayed in the input field 542 on the UI screen in FIG. 5C does not inhibit user input.

In step S809, the control unit 201 determines whether or not an operation of the button 545 to send a request for reflecting the connection information, of that in the input field 542 on the UI screen in FIG. 5C, to the camera 100 has been detected. When the control unit 201 determines that an operation of the button 545 to send a request for reflecting the connection information to the camera 100 has been detected, the control unit 201 proceeds the processing to step S810. When the control unit 201 determines that an operation of the button 545 to send a request for reflecting the connection information to the camera 100 has not been detected, the control unit 201 proceeds the processing to step S813.

In step S810, the control unit 201 determines whether or not the password of the input field 542 on the UI screen in FIG. 5C has been changed by the user. When the control unit 201 determines that the password of the input field 542 on the UI screen in FIG. 5C has been changed by the user, the control unit 201 proceeds the processing to step S811. When the control unit 201 determines that the password of the input field 542 on the UI screen in FIG. 5C has not been changed by the user, the control unit 201 proceeds the processing to step S812.

In step S811, the control unit 201 transmits a request for reflecting the connection information including the changed password of the input field 542 on the UI screen in FIG. 5C to the camera 100 via the first communication unit 211.

In step S812, the control unit 201 transmits a request for reflecting the connection information in which the 'null' indicating that the password is not updated is entered into the input field 542 on the UI screen in FIG. 5C, to the camera 100 via the first communication unit 211.

In step S813, the control unit 201 determines whether or not the connection with the camera 100 is disconnected. When the control unit 201 determines that the connection with the camera 100 is disconnected, the processing ends. When the control unit 201 determines that the connection with the camera 100 is not disconnected, the control unit 101 returns the processing to step S755.

Note that the process of establishing a Wi-Fi (registered trademark) connection with the PC 300 and the AP 400 will not be described.

The present embodiment is advantageous in cases in which the camera 100 is not provided with a display unit and the network connection settings cannot be entered or confirmed. However, the present embodiment is also naturally advantageous in cases in which a display unit is provided.

In the present embodiment described above, HTTP is used as the authentication method used when the PC 300 communicates with the camera 100 via the AP 400. However no such limitation is intended, and other authentication and authorization systems, such as OAuth 2.0, OpenID, OpenID Connect, Security Assertion Markup Language (SAML), and the like, may be used, or authentication may be not used when data is communication and only used when setting the communication settings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-167576, filed Oct. 12, 2021, which is hereby incorporated by reference herein in its entirety.

What is claimed is:

1. A communication apparatus comprising:
   a communication unit configured to communicate with an electronic apparatus;
   an accepting unit configured to accept input of connection information including first information, which is identification information of a first network to be used for wireless communication with an external apparatus, and second information, which is security information for connecting to the first network; and
   a control unit configured to transmit the connection information to the electronic apparatus via the communication unit,
   wherein, when acceptance of the connection information by the accepting unit starts, the control unit displays on a display unit a first display region for accepting input of the first information and displays the first information acquired from the electronic apparatus in the first display region, and
   when acceptance of the connection information by the accepting unit starts, the control unit also displays on a display unit a second display region for accepting input of the second information and displays dummy information in the second display region without acquiring the second information.

2. The apparatus according to claim 1, wherein
   when the dummy information displayed by the display unit is changed, the control unit transmits, to the electronic apparatus, a request for updating the second information already set for the electronic apparatus with the changed information;

when the dummy information displayed by the display unit is not changed, the control unit transmits, to the electronic apparatus, connection information obtained by converting the dummy information into third information; and the third information is information for notifying the communication apparatus that the second information already set for the electronic apparatus is not updated.

3. The apparatus according to claim 1, wherein when a user operation relating to the dummy information displayed by the display unit is detected, the control unit deletes the dummy information and allows new information to be entered.

4. The apparatus according to claim 3, wherein the control unit displays the new information in an appearance similar to that of the dummy information.

5. The apparatus according to claim 3, wherein the control unit displays the new information in an appearance different from that of the dummy information.

6. The apparatus according to claim 1, wherein the control unit displays, of the connection information acquired from the electronic apparatus, connection information not set for the electronic apparatus as a blank field on the display unit.

7. The apparatus according to claim 6, wherein when connection information is entered in the blank field, the control unit transmits, to the electronic apparatus, a request to set the entered connection information to the electronic apparatus.

8. The apparatus according to claim 1, wherein the communication unit is configured to connect to a second network formed by the electronic apparatus.

9. The apparatus according to claim 1, wherein the dummy information is information including a character or symbol that makes the content of the second information unrecognizable.

10. The apparatus according to claim 1, wherein when a notification indicating that the first network cannot be detected is received from the electronic apparatus, the control unit displays that the electronic apparatus cannot detect the first network or that the connection information of the first network needs to be updated on the display unit.

11. The apparatus according to claim 1, wherein when a notification indicating that authentication for connecting to the first network failed is received from the electronic apparatus, the control unit displays that authentication for connecting to the first network failed or that the connection information of the first network needs to be updated on the display unit.

12. The apparatus according to claim 1, wherein the control unit acquires, from the electronic apparatus, the number of characters of the second information that is already set for the electronic apparatus but not acquired from the electronic apparatus; and the second information that is already set for the electronic apparatus but is not acquired from the electronic apparatus is displayed on the display unit with the dummy information and the number of characters.

13. The apparatus according to claim 1, wherein the first network is a network to be used for wireless communication with the external apparatus via a wireless LAN access point;

the connection information includes an ID and a password for the access point and an ID and a password for the external apparatus to connect to the electronic apparatus via the access point; and in the connection information acquired from the electronic apparatus, the password has been converted into fourth information, and the fourth information is information for notifying the communication apparatus that the fourth information is already set for the electronic apparatus but has not been transmitted by the electronic apparatus.

14. The apparatus according to claim 1, wherein the first display region and the second display region are displayed on the same screen or simultaneously displayed on the same screen.

15. The apparatus according to claim 1, wherein the control unit sends a request for the connection information to the electronic apparatus in response to acceptance of the connection information starting.

16. A method of controlling a communication apparatus comprising:

wherein the communication apparatus includes a communication unit configured to communicate with an electronic apparatus, an accepting unit configured to accept input of connection information including first information, which is identification information of a first network to be used for wireless communication with an external apparatus, and second information, which is security information for connecting to the first network, and a control unit configured to transmit the connection information to the electronic apparatus via the communication unit, wherein the method includes:

when acceptance of the connection information by the accepting unit starts, displaying a first display region for accepting input of the first information and displaying the first information acquired from the electronic apparatus in the first display region; and when acceptance of the connection information by the accepting unit starts, displaying a second display region for accepting input of the second information and displaying dummy information in the second display region without acquiring the second information.

17. A non-transitory computer-readable storage medium storing a program for causing a processor to function as a communication apparatus comprising:

a communication unit configured to communicate with an electronic apparatus;

an accepting unit configured to accept input of connection information including first information, which is identification information of a first network to be used for wireless communication with an external apparatus, and second information, which is security information for connecting to the first network; and a control unit configured to transmit the connection information to the electronic apparatus via the communication unit, wherein, when acceptance of the connection information by the accepting unit starts, the control unit displays a first display region for accepting input of the first information and displays the first information acquired from the electronic apparatus in the first display region, and when acceptance of the connection information by the accepting unit starts, the control unit also displays a second display region for accepting input of the second information and displays dummy information in the second display region without acquiring the second information.

\* \* \* \* \*